United States Patent

Yamada et al.

[11] Patent Number: 5,734,407
[45] Date of Patent: Mar. 31, 1998

[54] IMAGE QUALITY CONTROL AT RESTART OF IMAGE FORMING APPARATUS

[75] Inventors: Kunio Yamada; Kiyotaka Ishikawa, both of Ashigarakami-gun, Japan

[73] Assignee: Fuji Xerox Co., Ltd., Tokyo, Japan

[21] Appl. No.: 621,614

[22] Filed: Mar. 26, 1996

[30] Foreign Application Priority Data

Mar. 31, 1995 [JP] Japan ................... 7-076401
Dec. 13, 1995 [JP] Japan ................... 7-324441

[51] Int. Cl.$^6$ .............. B41J 2/385; G03G 15/00
[52] U.S. Cl. ...................... 347/133; 399/46
[58] Field of Search .................. 347/131, 240, 347/251, 252–254, 133; 358/298, 456, 504; 399/181, 46, 73; 364/930.7, 930.42; 395/51, 61, 900, 930

[56] References Cited

U.S. PATENT DOCUMENTS

| | | | |
|---|---|---|---|
| 5,390,004 | 2/1995 | Hopkins | 399/42 |
| 5,400,120 | 3/1995 | Narazaki et al. | 399/73 |
| 5,483,328 | 1/1996 | Kawasaki et al. | 399/49 |
| 5,508,787 | 4/1996 | Hasegawa et al. | 399/31 |
| 5,510,896 | 4/1996 | Wafler | 358/296 |
| 5,528,730 | 6/1996 | Yagi et al. | 395/51 |

FOREIGN PATENT DOCUMENTS

| | | |
|---|---|---|
| A-63-177176 | 7/1988 | Japan |
| A-63-177177 | 7/1988 | Japan |
| A-63-177178 | 7/1988 | Japan |
| A-4-319971 | 11/1992 | Japan |
| A-4-320278 | 11/1992 | Japan |

Primary Examiner—Benjamin R. Fuller
Assistant Examiner—L. Anderson
Attorney, Agent, or Firm—Oliff & Berridge, P.L.C.

[57] ABSTRACT

When a control part is restarted, an average of a stored standard operation quantity and a stored operation quantity immediately before a stop of the control part is calculated. The average operation quantity (for instance, laser power) is applied to an image output part, and a resulting control quantity (for instance, a development density) is measured. A control rule retrieval unit calculates adaptabilities of respective control rules with respect to the measured control quantity, thereby synthesizing an application control rule. A new operation quantity is determined based on the application control rule and an error of the measured control quantity from a target value.

4 Claims, 28 Drawing Sheets

FIG.7

| CONTROL CASE NO. | STATUS QUANTITY | SET VALUE | | CONTROL QUANTITY (SENSOR OUTPUT VALUE) | | |
|---|---|---|---|---|---|---|
| | DATE/HOUR/ MIN./SEC. | LP SET VALUE | SCORO SET VALUE | SOLID | HIGHLIGHT | |
| 1 | 951201120010 | 83 | 130 | 185 | 23 | CLUSTER ① |
| 2 | 951201120025 | 102 | 121 | 176 | 15 | |
| 3 | 951201120040 | 154 | 98 | 195 | 33 | |
| 1 | 951202090005 | 148 | 115 | 185 | 30 | CLUSTER ② |
| 2 | 951222090015 | 146 | 110 | 175 | 19 | |
| 3 | 951202020025 | 147 | 118 | 180 | 20 | |
| 4 | | | | | | |

FIG.8

| CLUSTER NO. | STATUS QUANTITY | COEFFICIENTS OF CONTROL RULE (GAINS) | | | | | |
|---|---|---|---|---|---|---|---|
| | DATE/HOUR/ MIN./SEC. | a1 | a2 | a3 | b1 | b2 | b3 |
| 1 | 9512011120010 | 12.19 | 26.74 | -4304 | 11.16 | 24.45 | -4082 |
| 2 | 9512020090005 | 5.0 | 0 | -555 | 7.546 | -0.8189 | -992.6 |
| 3 | 9512020093104 | | | | | | |

FIG.25

| CONTROL RULE NO. | GENERATED TIME DATE/HOUR/ MIN./SEC. | COEFFICIENTS a a1 / a2 / a3 | COEFFICIENTS b b1 / b2 / b3 | ACCUMULATED ADAPTABILITY |
|---|---|---|---|---|
| 1 | 95120120040 | 12.19<br>26.74<br>-4304 | 11.16<br>24.45<br>-4082 | 17.62 |
| 2 | 951202020025 | 5.0<br>0<br>-555 | 7.546<br>-0.8189<br>-992.6 | 3.51 |

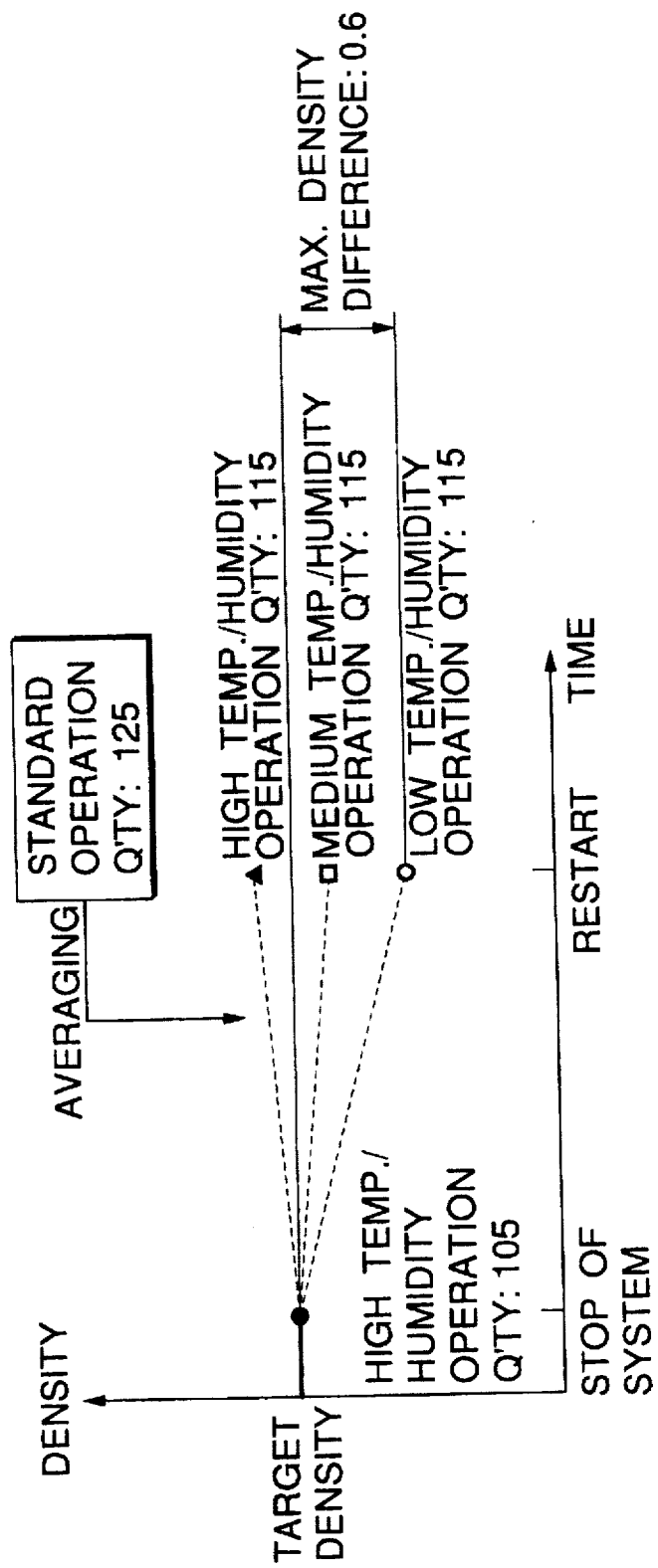

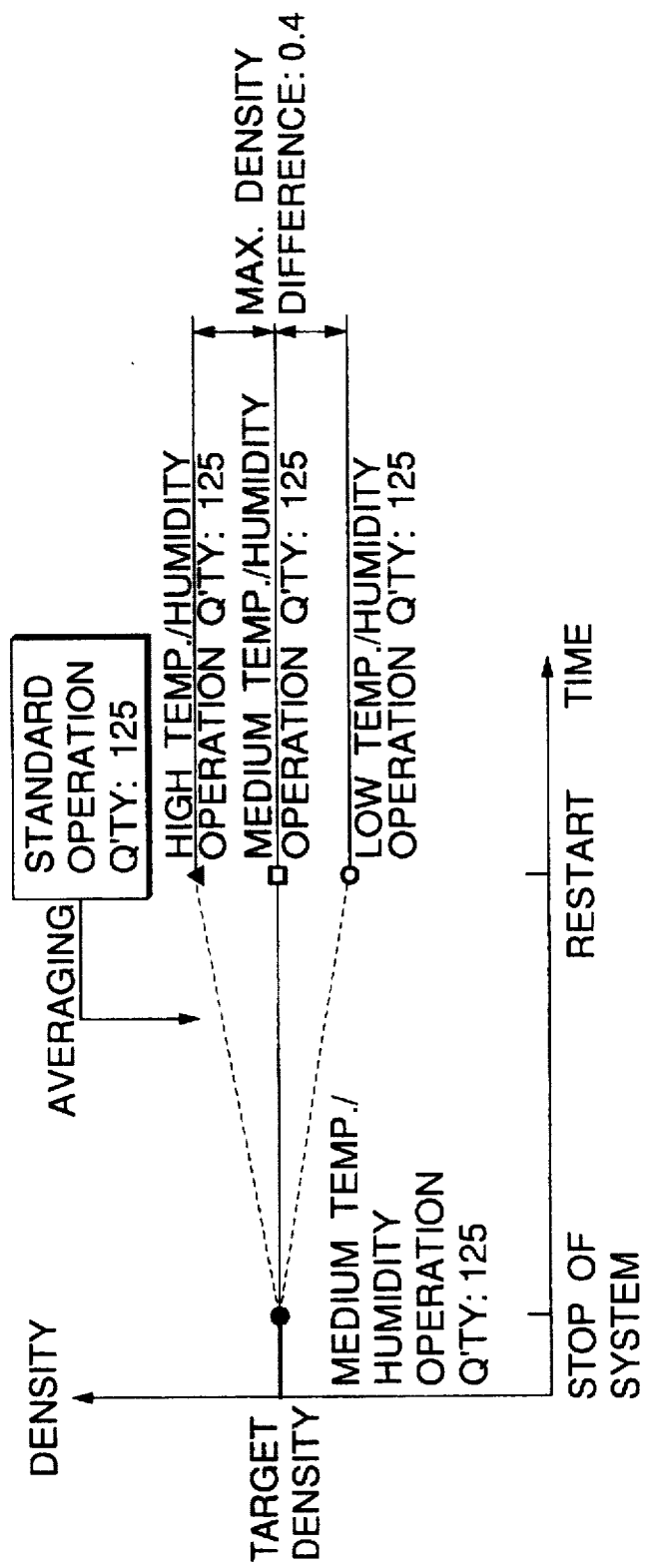

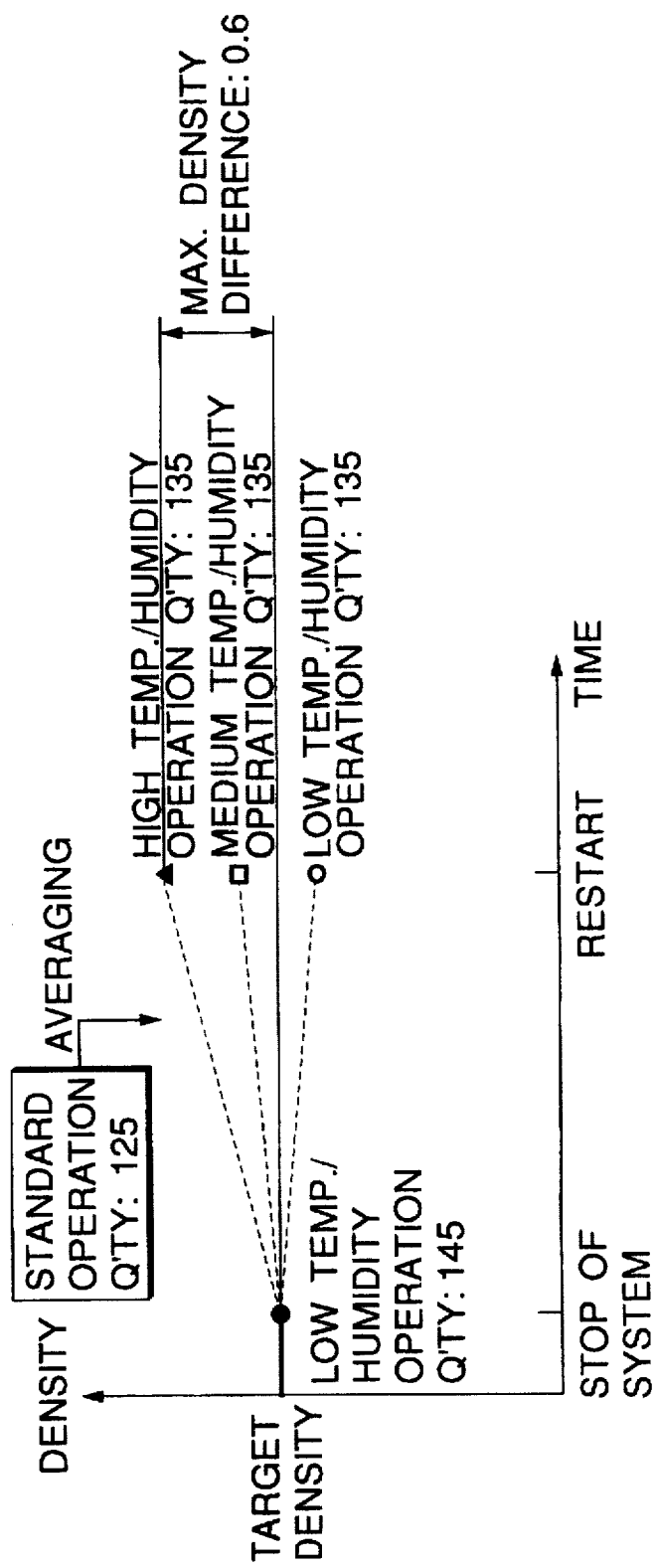

IMAGE QUALITY CONTROL AT RESTART OF IMAGE FORMING APPARATUS

BACKGROUND OF THE INVENTION

1. Field of the Invention

The present invention relates to an image forming apparatuses of various types such as an electrophotographic type and an ink jet type, and a control method therefor. In particular, the invention is intended to allow control for keeping the image quality at a given level to be carried out at a low cost with high accuracy, as well as to greatly reduce or substantially eliminate man-hours necessary for data collection and design optimization in developing a new product.

2. Description of the Related Art

Conventionally, in an image forming apparatus of an electrophotographic type, feedback control is employed to keep the image density at a optimized level. This is because in the electrophotographic type apparatus using static electricity, due to variations in the environmental conditions such as temperature, humidity, and the like, or due to the aging degradation of a photoreceptor or a developing agent, the image output state of the apparatus per se varies, which in turn varies the density reproduction performance.

In a general feedback control method, a density reproduction state is monitored by a density patch to find a difference between a target density and the thus monitored density, and the resultant difference is multiplied by a feedback gain to thereby calculate a correction quantity of a set value of a controlling actuator.

Here, in most cases, a developed patch is used as the above density patch. The reason for this is that the developed image can be formed and erased easily when compared with a transferred image or a fixed image to be formed on paper, and also that the developed image patch is extremely highly correlated with a fixed image density which can be obtained by a user. Also, as the controlling actuator, there are often used a charger application voltage, a quantity of exposure light, and a developing bias which have a decisive influence on the developing characteristics of the image forming apparatus.

For example, in feedback control techniques disclosed in Japanese Unexamined Patent Publication Nos. Sho. 63-177176, Sho. 63-177177, and Sho. 63-177178, the developed image density is controlled to a desired value by varying a developing potential. In this developing potential varying technique, both of one-component and two-component developing processes can be used.

However, the optimum developing potential is constantly influenced by uncontrollable various external factors such as temperature, humidity, the cumulative number of prints formed and the like and, therefore, when the charging potential, the quantity of exposure light and the developing bias are set, these external factors must be always taken into account. Also, a relationship between a quantity showing the status of an image forming apparatus main body such as temperature, humidity and the like (which is hereinafter referred to as a status quantity) and the set values of the charging potential, quantity of exposure light and developing bias is complicated and, at the present stage of technology, a satisfactory physical model has not been established on this relationship.

In view of the above circumstances, for example, control is employed which is quantified by using approximate equations. However, in the electrophotographic technology which consists mainly of an electrostatic process, normally, the optimum set values of the charging potential, the quantity of exposure light and bias have a non-linear relationship with respect to the status quantities, so that a satisfactory control accuracy cannot be obtained. Under these conditions, it is necessary to previously check various environmental conditions such as ambient effects under a high temperature and low humidity state or under a low temperature and low humidity state, effects due to degradation with time, and the like. That is, as the target control performance is higher, it is necessary to collect more detailed data in a wider condition range, which in turn requires vast man-hours for development.

Also, even the feedback gain that is determined at the cost of vast man-hours cannot be always recognized as the optimum gain partly because the individual image forming apparatuses differ from one another and partly because users' machine using conditions vary widely. Especially, the effects of the aging-degraded image forming apparatus on the image density vary greatly depending on the degrees of degradation of parts used in the respective apparatus and the conditions under which the apparatus are used. Therefore, the image forming apparatus produced using the above density control technology cannot always provide a satisfactory image density control performance on the market when it is used for a long period.

Further, in order to obtain a desired control accuracy, the above-mentioned control method, in most cases, requires a potential sensor for monitoring the charging potential and exposure potential as intermediate parameters, as well as a temperature sensor and a humidity sensor respectively for detecting environmental conditions, which results in the increased manufacturing cost.

Recently, as disclosed in Japanese Unexamined Patent Publication Nos. Hei. 4-319971 and Hei. 4-320278, there have been employed a fuzzy control method and a neural-network-based control method. These control methods are able to cope with even a non-linear case in which a relationship between the input and output is complicated. That is, these two control methods are used solely as means for enhancing the control accuracy. Therefore, these methods are little helpful in solving the above-mentioned problems: the vast man-hours necessary to gather a large amount of data; the increased cost caused by use of the sensors; and the failure to secure the long-term satisfactory image density control performance of the individual image forming apparatus after they are introduced into the market.

When the control accuracy of the image forming apparatus is enhanced by using the fuzzy or neural-network-based control method, in order to make the most use of its advantage of being suitable for a multi-input/multi-output operation, in most cases, there are employed a large number of inputs, that is, there are used a large number of sensors, which instead leads to an increase in the cost of the image forming apparatus used.

Further, in the fuzzy control method, membership functions must be tuned by engineers and, in the neural-network-based control system, although a learning operation itself can be automated, teacher data for the learning operation must be previously prepared by the engineers. That is, both of them require considerably man-hours for development.

In addition, even when the aging degradation data are previously collected and the fuzzy or neural-network-based control method is used with the thus collected data taken into account, if the input/output relationship itself has varied due to the actual aging degradation of parts used, difference between apparatuses, and replacement of parts, the image forming apparatuses based on such method are not able to cope with such varied input/output relationship by themselves. That is, the image density control performances of the individual image forming apparatuses after they are introduced into the market cannot be assured for a long period even when they employ the fuzzy or neural-network-based control method.

SUMMARY OF THE INVENTION

The present invention aims at eliminating the above-mentioned problems found in the conventional image forming techniques. Accordingly, it is an object of the invention to provide an image forming technique which is capable of controlling an operation amount simply and accurately with no need for engineers to grasp various environmental conditions previously, thereby being able to reduce man-hours for development to a great extent.

Another object of the invention is to provide a technique which, even when a vast number of image forming apparatuses are introduced into the market and they are respectively used in various ways and the parts thereof are replaced as the occasion demands, can maintain the quality of images formed by the individual image forming apparatuses at a high level.

A further object of the invention is to provide a technique which, when a system to be controlled is restarted, can reduce influences caused by the status change of the system before and after the system to be controlled is restarted, and thus can control the system quickly with a high accuracy from the beginning of the restart operation thereof.

To attain the above objects, according to the invention, there is provided an image forming apparatus which is arranged to control an operation quantity so that a control quantity relating to the image quality becomes a target value, the image forming apparatus comprising: means for setting the target value; means for measuring the control quantity; memory means for storing, as a control rule or rules, one or a plurality of functions of the operation and control quantities which functions are determined based on operation quantities actually applied in a series of image forming processes and corresponding control quantities actually measured; application control rule generating means for generating an application control rule to be used to calculate the operation quantity based on the control quantity from the one function or by combining at least part of the plurality of functions; means for varying the operation quantity in accordance with an error between the control quantity and the above target value; status transition judging means for judging whether a transition of a status of a main body of the image forming apparatus has occurred; and means for determining a new function from operation actually applied and control quantities actually measured in a series of image forming processes in response to a judgment output of the status transition judging means, and for causing the memory means to store the new function as a new control rule, wherein the application control rule generating means generates a new application control rule with the new control rule taken into account.

In this configuration, a control rule can be generated simply and easily according to the actually applied operation quantity and the control quantity measured when the operation quantity is applied. Further, as the status of the image forming apparatus main body is changed, a new control rule can be generated which is suitable for the new status, so that a highly accurate control can be carried out in accordance with the transition of the status of the image forming apparatus main body.

Also, in this configuration, there may be detected an event that may cause the status of the image forming apparatus main body to change at a high probability, such as a variation in temperature or humidity, to thereby judge for a transition of the status of the image forming apparatus main body.

The above event may include one or both of a fact that the working time of the image forming apparatus main body has exceeded a preset time after a previous affirmative judgment of a status transition, and a fact that the number of image prints formed by the image forming apparatus main body has exceeded a preset number after the previous status transition has been detected.

Alternatively, actually applied operation quantities and actually measured control quantities may be used to determine a new function only when a difference between the actually measured value of the control quantity and the target value has exceeded a preset value.

To achieve the above objects, according to another aspect of the invention, there is provided an image forming apparatus for controlling an operation quantity so that a control quantity relating to the image quality becomes a target value, the image forming apparatus comprising: means for setting the target value; means for measuring the control quantity; memory means for storing as control rules a plurality of functions each of which defines, in a coordinate space of the operation and control quantities, a surface representative of coordinates of operation quantities actually applied in a series of image forming processes and corresponding control quantities actually measured; means for determining, for each of the control rules, a difference between a measured control quantity that is measured when an operation quantity is actually applied and an expected control quantity that is obtained when the operation quantity is applied to the control rule; application control rule generating means for generating an application control rule to be used to calculate the operation quantity based on the control quantity by combining at least part of the plurality of control rules with weighting in which a weight increases as the difference decreases; and means for varying the operation quantity in accordance with the application control rule and an error between the control quantity and the target value.

In the above configuration, a plurality of control rules are combined together to thereby synthesize an application control rule and, the control rules are incorporated into the application control rule in such a manner that the more suitably a control rule is adapted to the current status of the image forming apparatus main body, the greater weight it is given. Therefore, the operation quantity control can be carried out with accuracy by use of the application control rule that matches the status of the image forming apparatus main body. Also, even if individual control rules are not highly accurate, a properly weighted combination of control rules can realize highly accurate control.

In the above configuration, the surface may be a flat plane or a curved surface.

Also, the application control rule generating means may select, in accordance with the differences, the control rules that are used to generate the application control rule.

Further, at least part of the plurality of control rules may be respectively correspond to typical statuses of the image forming apparatus main body.

Moreover, the image forming apparatus may further comprises status transition judging means for judging whether a transition of the status of the image forming apparatus main body has occurred, and means for generating a new control rule in response to a judgement output of the status transition judging means, and for causing the memory means to store the thus generated new control rule.

The image forming apparatus may further comprise status transition judging means for judging whether a transition of the status of the image forming apparatus main body has occurred, means for generating a new control rule in response to a judgement output of the status transition judging means, and means for causing the memory means to store the thus generated new control rule in place of a control rule that has not been selected for a longest time by the selecting means.

The image forming apparatus main body may be so structured as to charge electrically the surface of a photoconductive material uniformly, then form a latent image on the photoconductive material surface by use of a light illumination device, and then develop the latent image with a toner material. Also, the control quantity relating to the image quality may be optical densities of two kinds of developed patches formed on the photoconductive material surface, while the operation quantity may be an output of the light illumination device and a potential of the uniform charging.

To accomplish the above objects, according to still another aspect of the invention, there is provided an image forming apparatus for controlling an operation quantity so that a control quantity relating to the image quality becomes a target value, the image forming apparatus comprising: means for setting the target value; means for measuring the control quantity; memory means for storing as control rules a plurality of functions each of which defines, in a coordinate space of the operation and control quantities, a surface representative of coordinates of operation quantities actually applied in a series of image forming processes and corresponding control quantities actually measured; means for determining adaptabilities of the respective control rules to actually applied operation quantity and an actually measured control quantity in one or a plurality of control operations actually carried out; application control rule generating means for generating an application control rule to be used to calculate the operation quantity based on the control quantity by combining at least part of the plurality of control rules with weighting in accordance with the adaptabilities; and means for varying the operation quantity in accordance with the application control rule and an error between the control quantity and the target value.

To attain the above objects, according to a further aspect of the invention, there is provided an image forming apparatus for controlling an operation quantity so that a control quantity relating to image quality becomes a target value, said image forming apparatus comprising: means for setting the target value; means for measuring the control quantity; means for detecting a restart of the image forming apparatus; memory means for storing, as control rules, a plurality of functions of the operation quantity and the control quantity each of which functions is determined based on a given number of cases each including an operation quantity actually applied in the image forming apparatus and a corresponding control quantity actually measured; application control rule generating means for generating an application control rule to be used to calculate the operation quantity based on the measured control quantity by combining at least part of the plurality of functions; standard operation quantity storing means for storing a standard operation quantity in a standard status of the image forming apparatus; means for calculating, in response to detection of the restart of the image forming apparatus by the restart detecting means, a new operation quantity based on the standard operation quantity and an operation quantity that is determined based on the application control rule and an error of the measured control quantity from the target value; and means for changing the operation quantity based on the calculated new operation quantity.

BRIEF DESCRIPTION OF THE DRAWINGS

FIG. 7 is a table of case data to be stored in a control case memory 25 shown in FIG. 6;

FIG. 8 is a table of control rules to be stored in a control rule memory 29 shown in FIG. 6;

FIG. 25 is a table showing how to control rewriting of a control rule using cumulative adaptabilities;

FIG. 28 is a graph showing a relationship between an operation quantity and a control quantity before and after a system to be controlled is restarted in a case where an average value of an operation quantity set value before the system is stopped and a standard operation quantity is used as the operation quantity for an operation after the restart; and FIG. 29 and 30 are graphs each showing a relationship corresponding to that of FIG. 28 which relationship is obtained under different conditions from those of FIG. 28.

DESCRIPTION OF THE PREFERRED EMBODIMENTS

Embodiment 1

First, a description will be given of a first embodiment which is directed to the basic constitution according to the invention.

Figure 1:
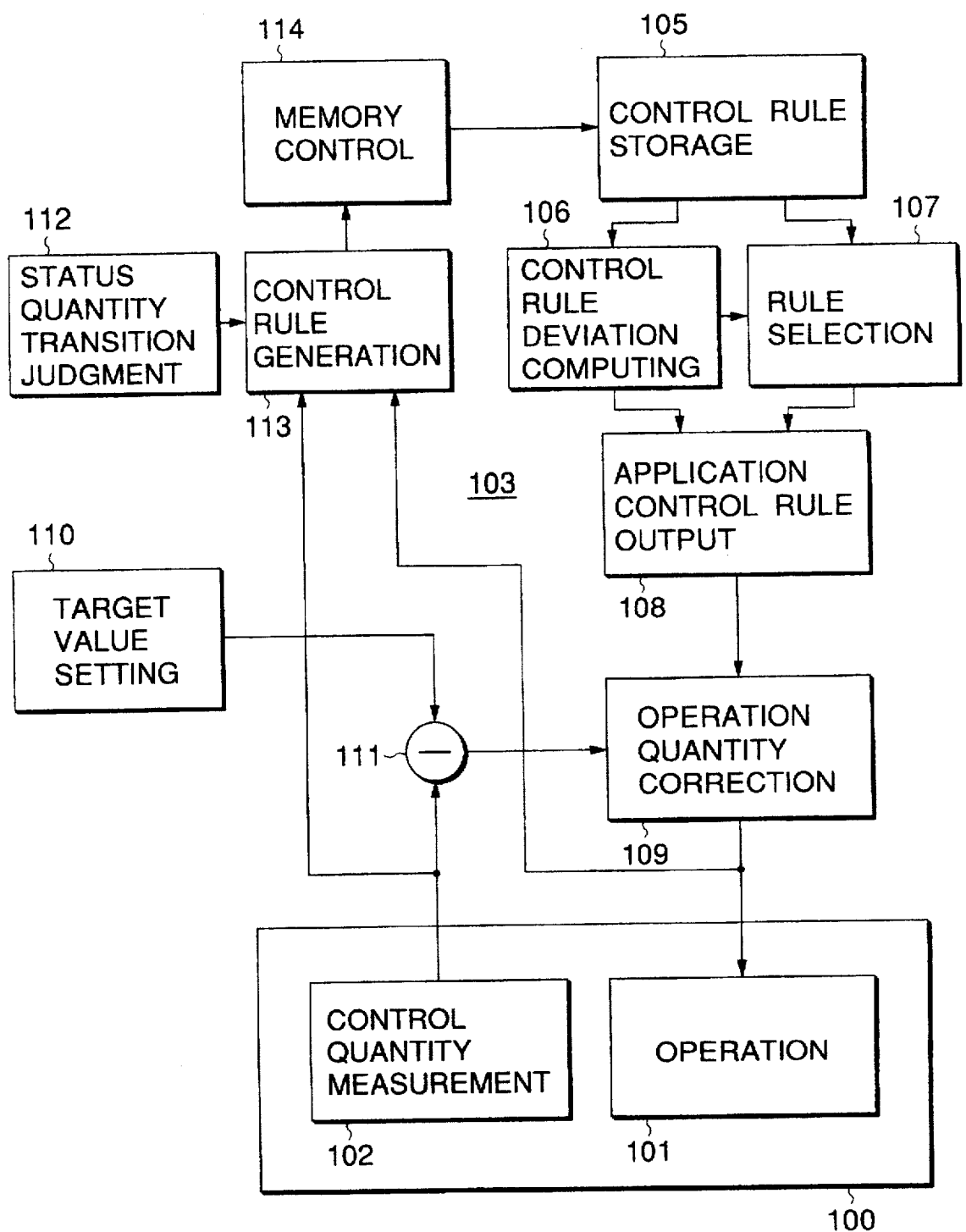
FIG. 1 is a block diagram of a first embodiment which corresponds to the principle operation of the present invention.

Now, FIG. 1 is a block diagram showing the whole configuration of this embodiment. In FIG. 1, an image forming apparatus main body 100 is an image forming apparatus which uses an electrophotograhic system, an ink jet recording system or the like. In the image forming apparatus main body 100, there is packaged a function block (not shown) which is used to carry out an image forming process. The operation part 101 of the image forming apparatus main body 100 is an operation part which is used to output a control quantity regulating the quality of an image formed, for example, an operation quantity determining the density of the image. The operation part 101, in the electrophotographic system, comprises the output power of a laser radiation device for forming a latent image, the charged potential of a charger, the charged quantity of a toner, and the like. The control quantity measuring part 102 of the image forming apparatus main body 100 is a measuring device which is used to measure the control quantity. For example, if the control quantity is the image density, then the measuring part 102 is an optical sensor which measures the image density.

A control part 103, together with the image forming apparatus main body 100, constitutes the image forming apparatus. The control part 103 is normally mounted in the image forming apparatus main body 100, but it can also be provided separately from the image forming apparatus main body 100. The control part 103 controls the operation quantity of the operation part 101 so that the control quantity of a given image to be formed by the image forming apparatus main body 100 can be maintained at a target value.

The control rule memory part 105 of the control part 103 is used to store one control rule or a plurality of control rules. The control rule is a function which defines a relationship between the operation quantity and the control quantity. This function is represented by a surface (a plane or a curved surface) in a coordinate space which is defined by the operation and control quantities. One control rule is generated by using two or more pieces of coordinate data, for example, three pieces of coordinate data that are represented by the operation quantity that is actually applied to the operation part 101 of the image forming apparatus main body 101 and the control quantity that is measured by the control quantity measuring part 102 when the operation quantity is actually applied.

The control rule stored in the control rule memory part 105 is supplied to a control rule deviation computing part 106, in which it is used to compute the adaptabilities of the respective control rules as will be described later. The control rule is also supplied to a rule select part 107, while part or all of the control rules are supplied to an application control rule output part 108.

The control rule deviation computing part 106, for each of the control rules, finds a deviation or a difference between a control quantity expected when the control rule is applied to an operation quantity in a given image forming process (for example, the last or previous image forming process to be measured) and an actual control quantity in the given image forming process. The difference is supplied to the application control rule output part 108. Responsive to this, the output part 108 combines together the control rules using a weight which increases as the difference decreases, and outputs the resultant combination as an application control rule which can be applied to determine an operation quantity. The combination of the control rules can be achieved, for example, by adding together functions representative of the control rules with weighting.

The rule selecting part 107 selects the control rule in accordance with the deviation or difference supplied from the control rule deviation computing part 106. For example, the rule selecting part 107 selects a given number of control rules in increasing order of the size of the deviations, or selects the control rules the deviations of which are equal to or less than a preset value.

An operation quantity correcting part 109 varies the operation quantity of the operation part 101 in accordance with the application control rule that is output by the application rule output part 108. That is, an error between a target value set by an target value setting part 110 and a control quantity measured by the control quantity measuring part 102 is detected by an error detector 111, and an operation quantity (or a variation thereof) to cancel this error is computed according to the application control rule. The thus computed operation quantity is then added to the operation part 101.

A status transition judging part 112 is used to judge the transition of the status of the image forming apparatus main body. That is, the term "status" means such status of the image forming apparatus main body 100 that influences the quality of an image, and the status includes temperature, humidity and the like. The transition of the status may be judged in accordance with the temperature, humidity and the like. However, more conveniently, the transition of the status can be judged from an elapsed time after the previous status transition, or from the number of prints of images formed after the previous status transition. If the status is changed, then it may be difficult that the new status can be dealt with accurately only by the control rule used until then. For this reason, a control rule generating part 113 generates a new control rule which can be used to cope with the changed or new status. This new control rule is also generated in accordance with the operation quantity in the image forming process and the measured control quantity.

The thus newly generated control rule is stored in the control rule memory part 105 by a memory control part 114. When the quantity of the control rules to be stored reaches a given quantity, a new control rule is registered instead of the oldest control rule, that is, the control rule that has not been used for the longest time. The control rule can also be stored and managed by other various means.

In the above configuration, if the transition of the status is judged in accordance with to the elapsed time or the number of image prints formed, then there is generated a control rule which is properly representative of the current status and the control of the image forming apparatus main body 100 is executed according to an application control rule reflecting the current status. Also, the adaptabilities of the respective control rules are judged according to the deviations of the control rules, and a control rule having a higher adaptability to the current status is reflected on the application control rule with a heavier weight. This makes it possible to realize a suitable control for the status transition and thus a fine control can be achieved by use of a reduced number of control rules.

Embodiment 2

Next, a description will be given below of a second embodiment which is a more detailed configuration according to the invention. In this embodiment, the present invention is applied to an image forming apparatus of an electrophotographic type in which, after the surface of a light conductor is charged uniformly with a scorotron charger, latent images are formed by radiation of laser beams and the thus formed latent images are then developed with a toner. In this embodiment, a control quantity is an image density (which includes two kinds of densities, that is, a solid density and a highlight density), while an operation quantity is the grid potential of the scorotron charger and the output of the output part of the laser beams.

(1) Configuration of Image Forming Apparatus

Figure 2:
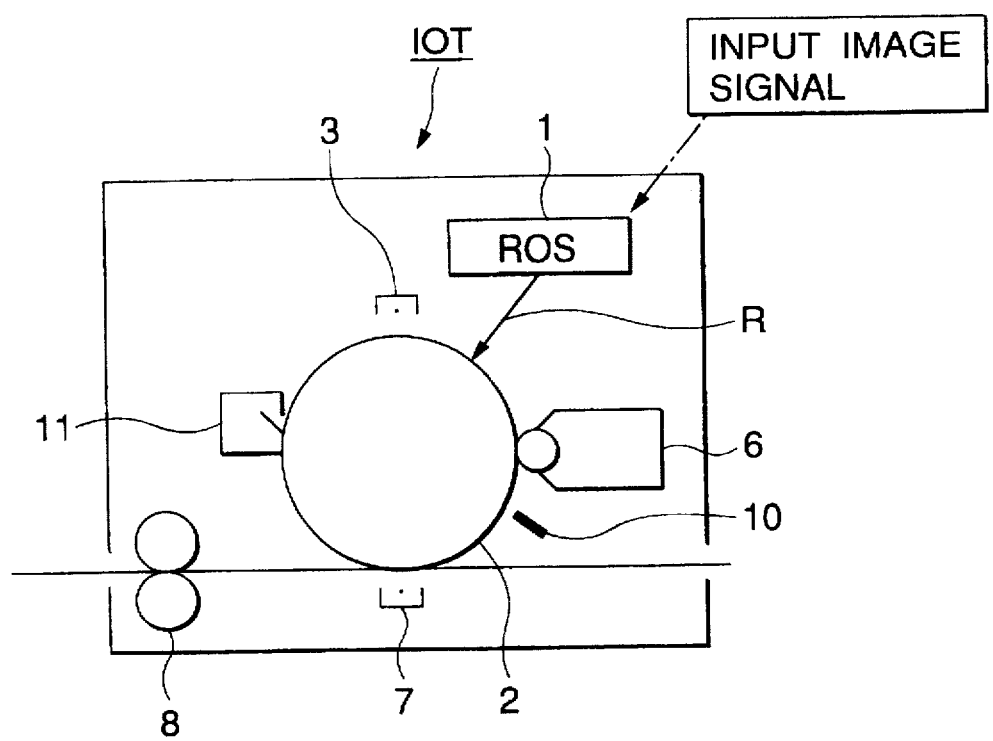
FIG. 2 is a block diagram showing the structure of an image output part IOT included in a second embodiment in which the invention is applied to an image forming apparatus of an electrophotographic type.

FIG. 2 shows the outline of the image output part IOT (Image Output Terminal) of an image forming apparatus according to the present embodiment. In FIG. 2, there are omitted an image read art and an image processing part. That is, there is shown only the image output part IOT of an electrophotographic type.

Describing an image forming procedure with reference to FIG. 2, an original image signal, which is obtained by an image read part (not shown) reading a document or formed by an external computer (not shown), is firstly processed properly in an image processing part (not shown) to thereby obtain an input image signal. The thus obtained input image signal is input into a laser output part 1, where it is used to modulate a laser beam R. Then, the laser beam R that is modulated by the input image signal is raster radiated onto a photoreceptor 2.

On the other hand, the photoreceptor 2 is charged uniformly by a scorotron charger 3 and, if the laser beam R is radiated onto the photoreceptor 2, then there is formed on the surface of the photoreceptor 2 an electrostatic latent image which corresponds to the input image signal. Next, the electrostatic latent image is toner developed by a developing device 6, the developed toner is transferred to a sheet (not shown) by a transfer device 7, and the developed toner is fixed by a fixing device 8. After then, the photoreceptor 2 is cleaned by a cleaner 11, which completes one image forming operation. Also, reference character 10 designates a developed density sensor which detects the densities of a developed image patch (to be discussed later) formed outside an image area.

(2) Developed Patch Forming Mechanism and its Monitoring Mechanism

Figure 3:
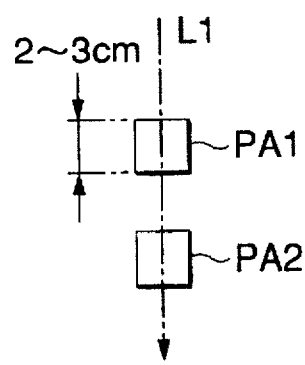
FIG. 3 shows how to generate patches for density detection in the second embodiment.
Figure 4:
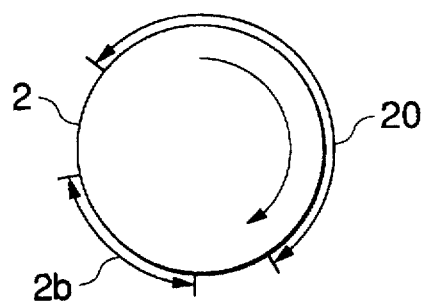
FIG. 4 shows timings for forming the patches and an input signal image in the second embodiment.

Here, a description will be given below of a developed image patch and its monitoring mechanism employed in the present embodiment. The developed image patch is used to monitor an output image density and, as shown in FIG. 3, as a density patch, there are employed two kinds of density patches, that is, a solid (dot coverage of 100%) density patch PA1 and a highlight (dot coverage of 20%) density patch PA2. As shown in FIG. 3, either of the solid density patch PA1 or highlight density patch PA2 is set to be of the order of 2 to 3 cm square and is formed outside the image area of the photoreceptor 2. That is, as shown in FIG. 4, after a latent image is formed in the image area 2a, the solid density patch PA1 and highlight density patch PA2 are formed sequentially in a vacant area 2b.

Also, the density sensor 10 comprises an LED radiation part for radiating light onto the surface of the photoreceptor 2, and a photosensor for receiving a regularly reflected light or a diffused light from the surface of the photoreceptor 2, while a line L1 shown in FIG. 3 is the detection line of the developed image density sensor 3. That is, the solid density patch PA1 and highlight density patch PA2 are formed on the detection line L1 and pass sequentially in the neighborhood of the developed image density sensor 10.

Figure 5:
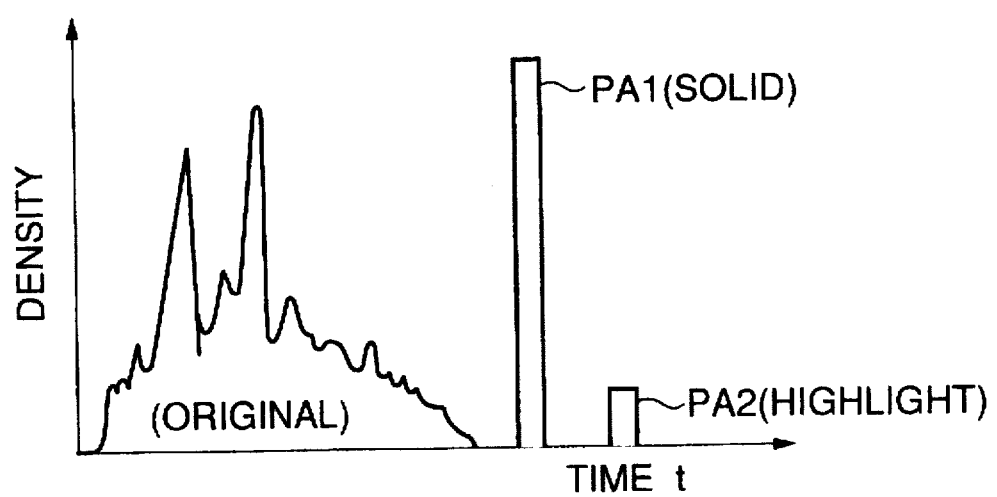
FIG. 5 is a graph showing the density of an image formed in the second embodiment.

Here, FIG. 5 is a graphical representation which shows an example of the output signals of the developed image density sensor 10. As shown in FIG. 5, there is firstly obtained a density detection signal corresponding to the image of a document and, after then, there are obtained the density detection signals of the solid density patch PA1 and highlight density patch PA2 respectively. Since the solid and highlight density patches PA1 and PA2 are formed outside the image area, they are not transferred to the sheet but are erased when they pass through the cleaner 11 portion.

The reason why the densities of the developed image patches are detected in the present embodiment is that they have a high correlation with the density of a fixed image that is given to a user (namely, a final image density) and also that the patches can be removed by the cleaner 11. Also, in other timings than the image forming timing, the developed image patches may also be formed within the image area. Further, as the developed image patch, there can also be used a developed image patch of other dot coverage.

(3) Configuration of Control Part

Figure 6:
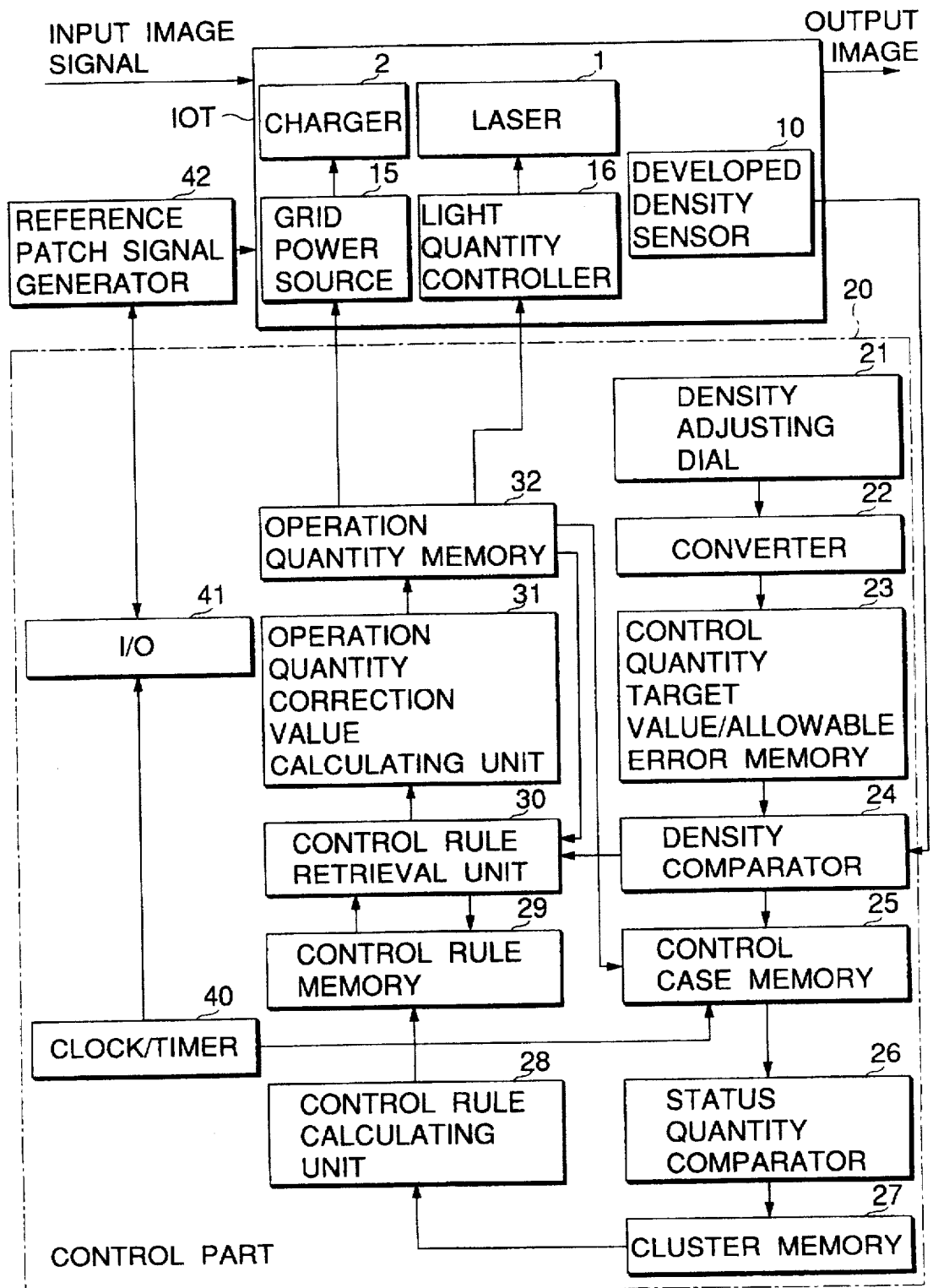
FIG. 6 is a block diagram showing the configuration of a control part 20 in the second embodiment.

Next, FIG. 6 is a block diagram showing the configuration of a control part 20 which controls the scorotron charger 3 and the laser output part 1. In FIG. 6, reference character 21 designates a density adjusting dial which can be operated by an operator to set a value corresponding to a desired density. The set value of the density adjusting dial 21 is converted by a converter 22 to a value corresponding to each of the outputs of the developed image density sensor 10 (in the present embodiment, a value in the range of 0–255). A target density output from the converter 22 is stored in a control quantity memory 23. In this case, the control quantity memory 23 stores therein an allowable error as well.

On the other hand, the output signal of the developed image density sensor 10 is compared with the output signal of the memory 23 in a density comparator 24. This comparison is made with reference to the allowable error stored in the memory 23. The output signal of the developed image density sensor 10 is supplied to a control rule retrieval unit 30 when a difference between the above output signals is within an allowable value, while it is supplied to a control case memory 25 when the difference is equal to or larger than the allowable value.

The control case memory 25 is a memory which stores control cases and, in particular, it stores three kinds of quantities in a set, that is, a status quantity (a representative value), an operation quantity, and a control quantity. The reason why the control cases are stored in this manner is to carry out various kinds of controls in accordance with the control cases stored in the past.

Here, the term "status quantity" to be stored in the control case memory 25 may be the temperature and humidity that have dominant influences on the electrophotographic process, or a quantity of degradation with the passage of time. Since these quantities can be considered almost constant within a limited period of time, in the present embodiment, instead of such quantities, there is used the time of occurrence of a case (which includes the date, hour, minute, and second), or the number of image prints formed. If the case occurrence time is within a given time unit (that is, a previously determined time unit such as 3 minutes, 5 minutes, 10 minutes or the like), then the status of the image output part IOT is considered constant during the given time unit. This is because it can be expected that, if two cases occur at mutually near times, then the two cases are almost under the same temperature and humidity condition and the degrees of degradation with the passage of time thereof are also almost the same. Also, the time data that represent the occurrence times, in the present embodiment, are supplied from a clock timer 40 shown in FIG. 6. Also, it can be checked from the cumulative number of prints formed whether the two cases are under the same condition or not.

Next, the operation quantity means the adjustment quantities of parameters which are used to vary the output values of devices to be controlled and, in the present embodiment, the operation quantity includes two kinds of quantities, that is, the grid voltage set value (0–255, which is hereinafter abbreviated to a scoro set value) of the scorotron charger 3 and the laser power set value (0–255, which is hereinafter abbreviated to an LP set value). The reason why these two quantities are used as the operation quantity is that the final image density to be controlled includes the solid density portion and highlight density portion and also that the scoro set value and LP set value have a high correlation with the solid density and highlight density.

Also, the scoro set value and LP set value are respectively stored in an operation memory 32, while the scoro and LP set values that correspond to the output signal of an operation quantity correction value calculating unit 31 are read out from the operation quantity memory 32 as the occasion demands. The scoro set value read out from the operation quantity 32 is supplied to a grid power source 15 and, responsive to this, the grid power source 15 applies to the scorotron charger 3 a voltage corresponding to the scoro set value. Also, the LP set value read out from the operation quantity memory 32 is supplied to a light quantity controller 16 and, responsive to this, the light quantity controller 16 applies to laser output part 1a laser power corresponding to the LP set value.

Next, the control quantity to be supplied to the control case memory 25 is the output signal of the developed image density sensor 10 and, as a result of the above operation, in the control case memory 25, there are stored such control cases as shown in a table in FIG. 7. In this table, for example, referring to a case 1 in a cluster 1, the status quantity (occurrence time) is 951201120010 ('95, December 1, 12:00:10); the LP set value is 83; the scoro set value is 130; and, the control quantity (sensor output value) is 185 in the solid portion and 23 in the highlight portion. Also, in a case 1 in a cluster 2, the status quantity is 951202090005 ('95, December 2, 09:00:05); the LP set value is 148; the scoro set value is 115; and, the control quantity is 185 in the solid portion and 30 in the highlight portion. As will be discussed later, a control rule is formed for each cluster of control cases.

Next, a status quantity comparator 26, a cluster memory 27, and a control rule calculating unit 28 shown in FIG. 6 have a function of referring to the control cases stored in the control case memory 25 and extracting control rules therefrom. The operations of these blocks will be described later in detail.

A control rule memory 29 is a memory which stores a plurality of control rules operated by the control rule calculating unit 28. When the control rule memory 29 receives a request from a control rule retrieval unit 30, the control rule memory 29 gives the control rule retrieval unit 30 a control rule corresponding to the request. In this case, the control rule retrieval unit 30 requests the control rule memory 29 to supply a control rule which corresponds to a density difference supplied from the density comparator 24 and an operation quantity (that is, LP set value and scoro set value) supplied from an operation quantity memory 32. The control rule memory 29, as shown in FIG. 8, stores the coefficients (gains) of control rules. The previously described control case memory 25 stores the cases necessary to form control rules, but, basically, no other control rules than the newest control rule are not used. For this reason, each time a cluster for cases is formed, the data on the previous cluster are reset.

Next, the operation quantity correction value calculating unit 31 finds the correction value of the operation quantity using a control rule retrieved by the control rule retrieval unit 30 and then supplies the resultant correction value to the operation quantity memory 32. To clearly express a control rule which is applied to compute the correction value of the operation quantity (the operation quantity itself can also be used), this control rule is referred to as an application control rule. Now, on receiving the operation quantity correction value, the operation quantity memory 32 supplies an operation quantity corresponding to the operation quantity correction value, that is, the LP set value and scoro set value to the grid power source 15 and light quantity controller 16 respectively.

On the other hand, a reference patch signal generator 42 is a circuit which directs the formation of the solid density patch PA1 and highlight density patch PA2 and, at a patch forming timing, outputs a calibration reference patch signal to the image forming part ITO. As a result of this, the solid density patch PA1 and highlight density patch PA2 shown in FIG. 3 are formed.

In this case, the operating timing of the reference patch signal generator 42 is instructed by an I/O adjusting part 41. The I/O adjusting part 41 monitors a time signal output from a clock timer 40 and supplies an operating timing signal to the reference patch signal generator 42 so that the solid density patch PA1 and highlight density patch PA2 can be respectively formed at given positions.

(4) Initializing Operation

Figure 9:
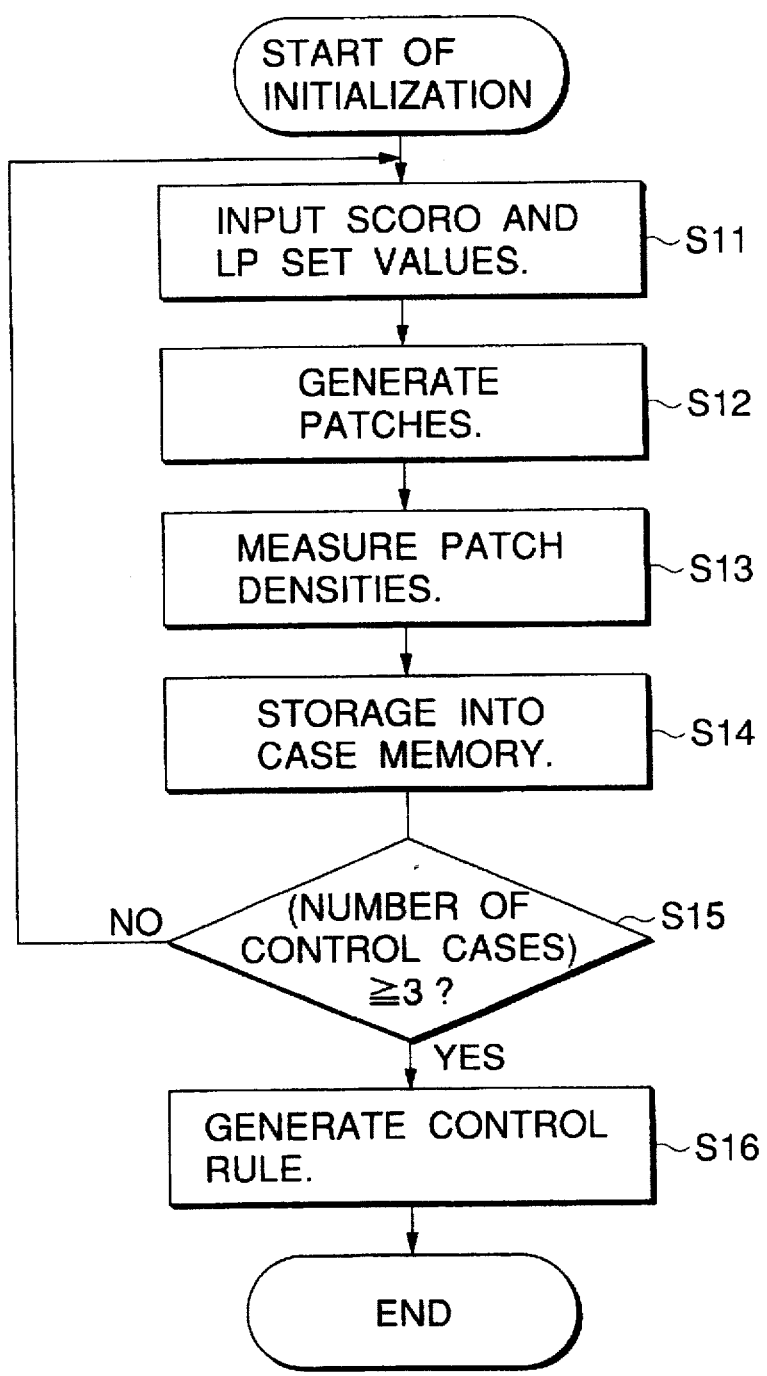
FIG. 9 is a flowchart showing an initializing operation of the second embodiment.

Next, a description will be given below of the operation of the present embodiment having the above-mentioned configuration. First, an initialization processing (a so-called function setup processing) will be described mainly with reference to FIG. 9. At a first step, an engineer sets properly the scoro set value and LP set value respectively selected as the controlling parameters (S11). The control part 20 forms the solid density patch PA1 and highlight density patch PA2 (S12), the optical densities of the two patches are respectively measured by the developed image density sensor 10 (S13), and the measured contents are stored in the control case memory 25 as a control case (S14). As a result of this, the first control case (control case 1) is stored in the control case memory 25.

Similarly, while the engineer is varying the scoro set value and LP set value, the engineer allows two more control cases to be stored into the control case memory 25. That is, during the control unit setup time (within the time in which the status quantity is constant), the engineer forms a total of three control cases and stores them into the control case memory 25 (S15).

Figure 10:
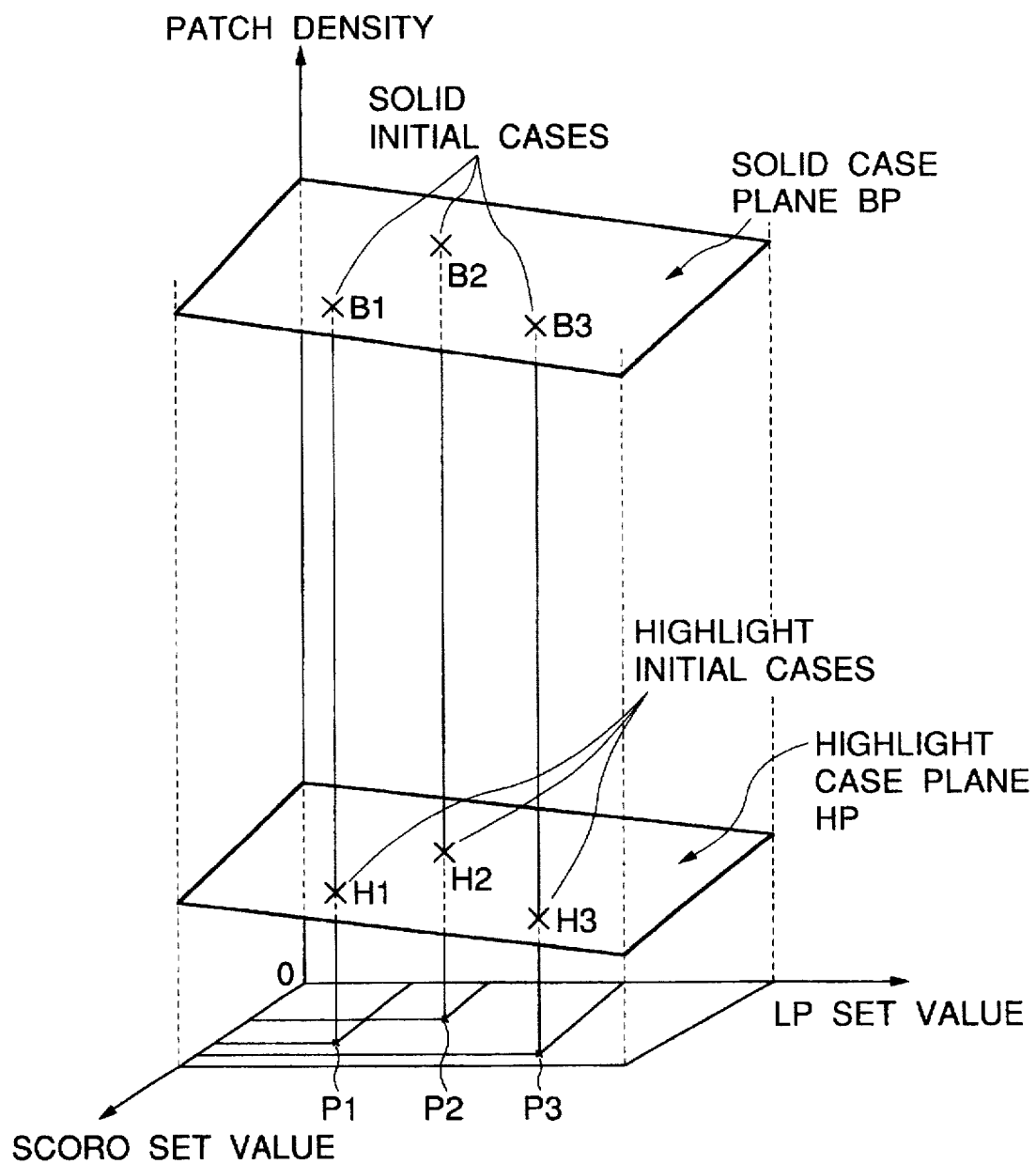
FIGS. 10 and 11 illustrates the initializing operation of FIG. 9.

When the three control cases in the initializing operation are stored in the control case memory 26, then the storage contents of the memory 26 are supplied through the status quantity comparator 26 and cluster memory 27 to the control rule calculating unit 28, where a control rule is generated. The thus generated control rule is extracted as control case planes as shown in FIG. 10 (S16). To determine the control case planes of FIG. 10, there are necessary three independent control cases. Of course, four or more control cases may also be used. In this case, a square mean error method or the like is used to determine the optimum control case planes.

In FIG. 10, P1, P2 and P3 respectively designate three points which point out three combinations of the scoro set values and LP set values in connection with the three control cases in the initializing operation. Here, points respectively indicating the highlight densities (that is, the detected densities of the highlight density patches) corresponding to the points P1, P2 and P3 are expressed as H1, H2 and H3, respectively. Similarly, points respectively representing the solid densities (the detected densities of the solid density patches) corresponding to the points P1, P2 and P3 are expressed as B1, B2 and B3, respectively. A plane passing through the three points B1, B2 and B3 is called a solid case plane BP, while a plane passing through the three points Hi, H2 and H3 is called a highlight case plane HP. Here, when the status quantity remains unchanged, points pointing out solid densities obtained when the scoro set value and LP set value are varied properly are all contained in the solid case plane BP. Similarly, when the status quantity remains unchanged, points indicating highlight densities obtained when the scoro set value and LP set value are varied properly are all contained in the highlight case plane HP. In this manner, the solid case plane BP and highlight case plane HP indicate all cases obtained when the status quantity remains unchanged. In other words, these two planes represent the control rules that relate to the solid and highlight densities in the initializing operation. These processes complete the initializing process of the present embodiment.

Figure 11:
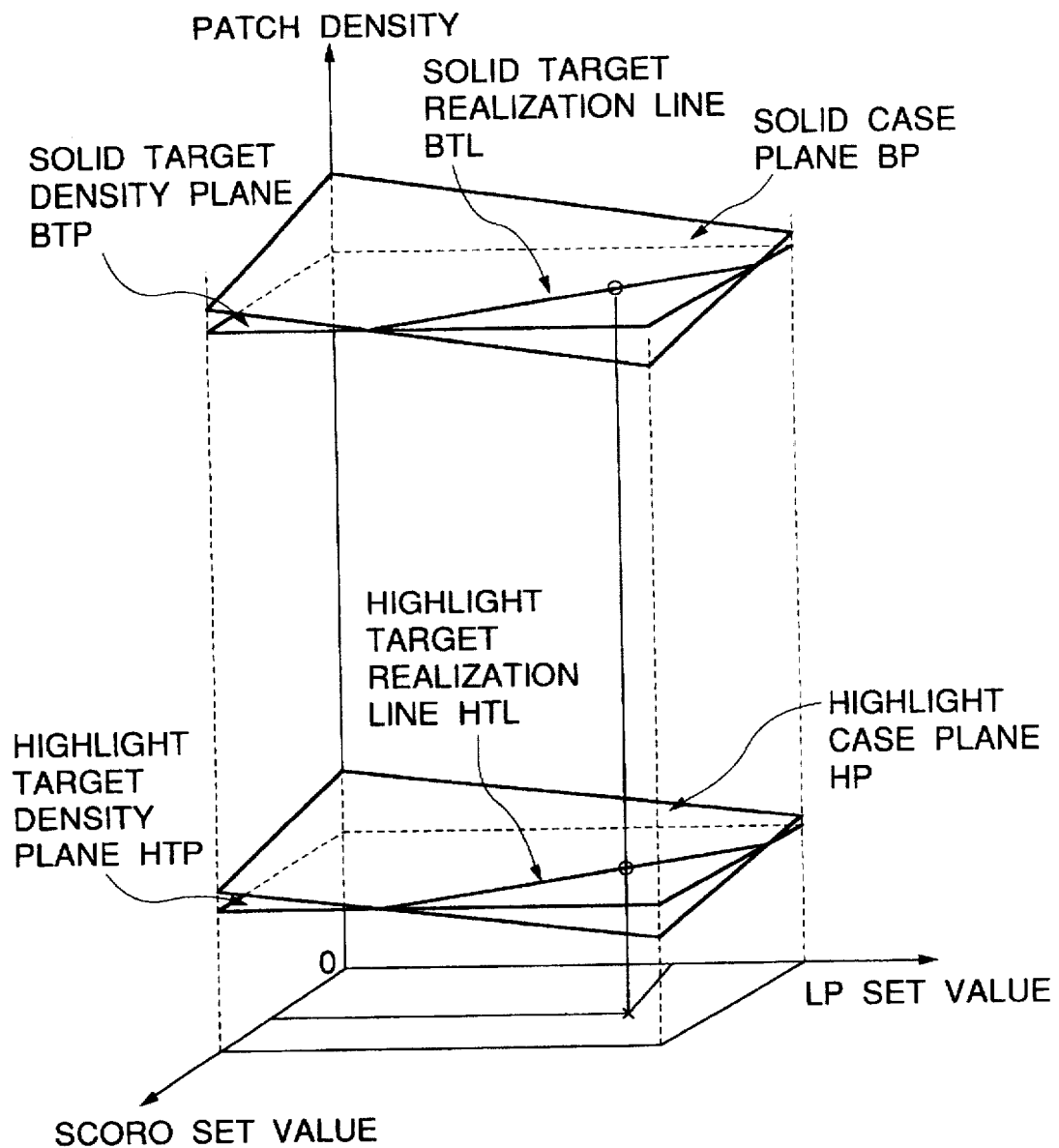

If the thus obtained control rules are used, then a scoro set value and an LP set value with respect to a given target density can be determined uniquely. That is, if a desired density indication value from a user is input, then a solid density (a solid target density) and a highlight density (a highlight target density) are calculated in accordance with the indication value input. As shown in FIG. 11, a plane containing the solid target densities (a solid target density plane BTP) and a plane containing the highlight target densities (a highlight target density plane HTP) are respectively superposed on the solid case plane BP and highlight case plane HP. An intersection line BTL intersecting the solid case plane BP and solid target plane BTP is the aggregation of points which satisfy the control rule on the solid density and indicate the solid target densities. Also, an intersection line HTL intersecting the highlight case plane HP and highlight target density plane HTP is the aggregation of points which satisfy the control rule on the highlight and indicate the highlight target densities. There is obtained a set of scoro and LP set values which satisfies both of the two intersection lines BTL and HTL. This set of scoro and LP set values is an intersection point between the projections of the intersection lines BTL and HTL in a plane which is defined by the coordinate axis of the scoro set values and the coordinate axis of the LP set values.

The above can be expressed as follows by use of mathematical equations. The control rule on the solid density and the control rule on the highlight density can be expressed in the following manner:

$$D100 = a1 \cdot LP + a2 \cdot SC + a3$$

$$D20 = b1 \cdot LP + b2 \cdot SC + b3$$

where D100 is a solid density, D20 is a highlight density, LP is an LP set value, and SC is a scoro set value while a1, a2, a3, b1, b2 and b3 are coefficients. If these expressions are solved with respect to the scoro set value SC and the LP set value LP, then the following expressions can be obtained:

$$SC = (b1 \cdot D100 - a1 \cdot D20 - a3 \cdot b1 + a1 \cdot b3)/(a2 \cdot b1 - a1 \cdot b2)$$

$$LP = (b2 \cdot D100 - a2 \cdot D20 - a3 \cdot b2 + a2 \cdot b3)/(a1 \cdot b2 - a2 \cdot b1)$$

If a solid target density and a highlight target density are respectively substituted into D100 and D20 of these expressions, then LP and SC can be determined.

On the other hand, when the solid and highlight densities of the case that satisfies the control rule are previously measured, the scoro and LP set values can also be found from these solid and highlight densities.

$$\Delta D100 = a1 \cdot \Delta LP + a2 \cdot \Delta SC$$

$$\Delta D20 = b1 \cdot \Delta LP + b2 \cdot \Delta SC$$

where ΔD100 is a difference between the solid density of the case and the target solid density, ΔD20 is a difference between the highlight density of the case and the target highlight density, ΔLP is a difference between the LP set value of the case and the next-time LP set value, and ΔSC is a difference between the scoro set value of the case and the next-time scoro set value. If these expressions are solved with respect to the difference ΔSC between the scoro set values and the difference ΔLP between the LP set values, then there can be obtained the following expressions:

$$\Delta SC = (b1 \cdot \Delta D100 - a1 \cdot \Delta D20)/(a2 \cdot b1 - a1 \cdot b2)$$

$$\Delta LP = (b2 \cdot \Delta D100 - a2 \cdot \Delta D20)/(a1 \cdot b2 - a2 \cdot b1)$$

If ΔD100 and ΔD20 are substituted into these expressions, then ΔLP and ΔSC can be determined, so that the next-time scoro and LP set values can be found.

The control rule can be expressed by the coefficients a1, a2, a3, b1, b2 and b3, or by a1, a2, b1 and b2.

(5) Basic Operation

Figure 12:
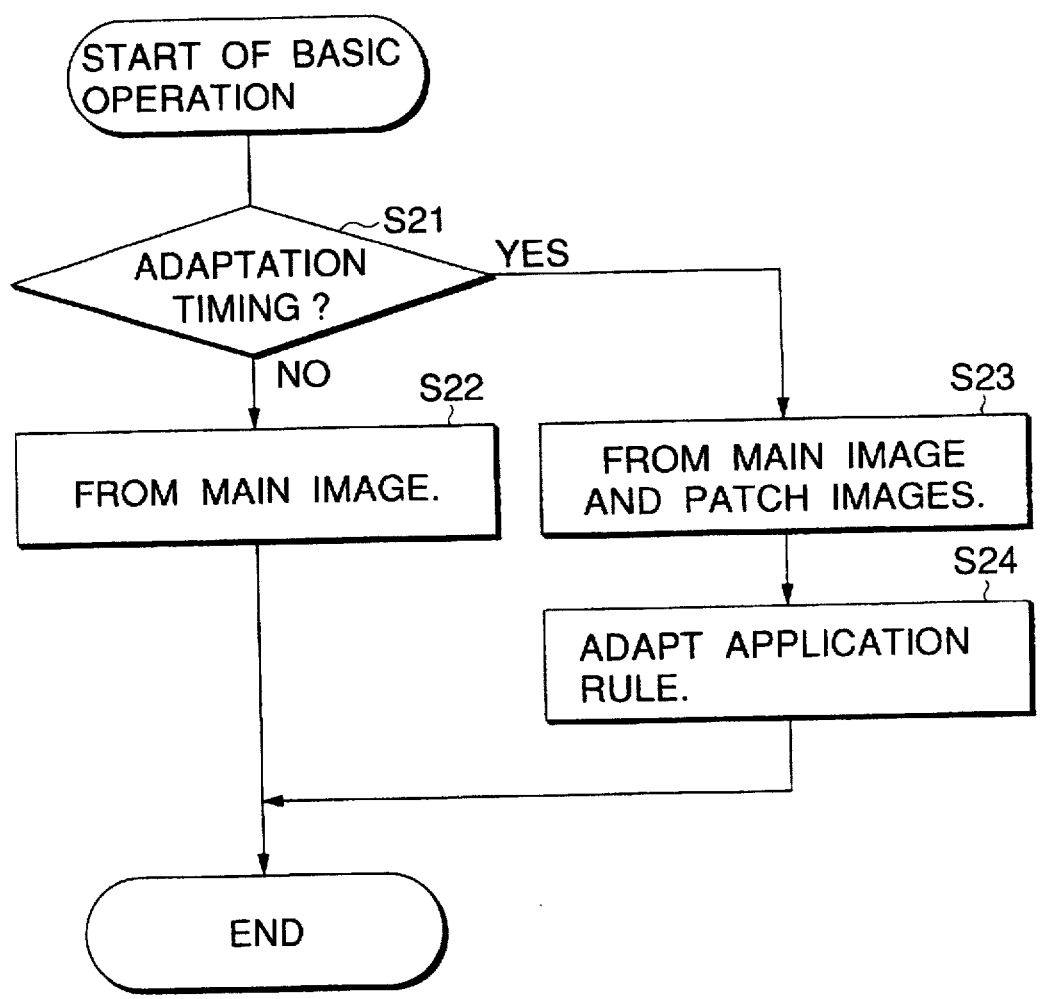
FIG. 12 is a flowchart showing the basic operation of the second embodiment which is performed after the initialization.

Next, a description will be given below of the operation of the image forming apparatus after initialized. The operation of the image forming apparatus after initialized, as shown in FIG. 12, consists of an image forming operation (S22 and S23) and an application rule adapting operation (S24). The image forming operation is an image forming operation of an ordinary electrophotographic system, while the application rule adapting operation is an operation to adapt a rule that is applied when controlling an image density. The adapting operation can be performed by forming a patch image and measuring the density of the patch image, which will be described later in detail. In the embodiment 1, since the patch image can be formed simultaneously with a main image (FIG. 4), at the adapting timing, not only the main image but also the patch image are formed (S21 and S22). The adapting timing can be set arbitrarily, for example, it can be set each time a given number of main image prints are formed. In particular, the matching timing can be set for each print or for every 10 prints. Alternatively, the matching timing can be set after passage of a given time, or according to occurrence of a given event.

Figure 13:
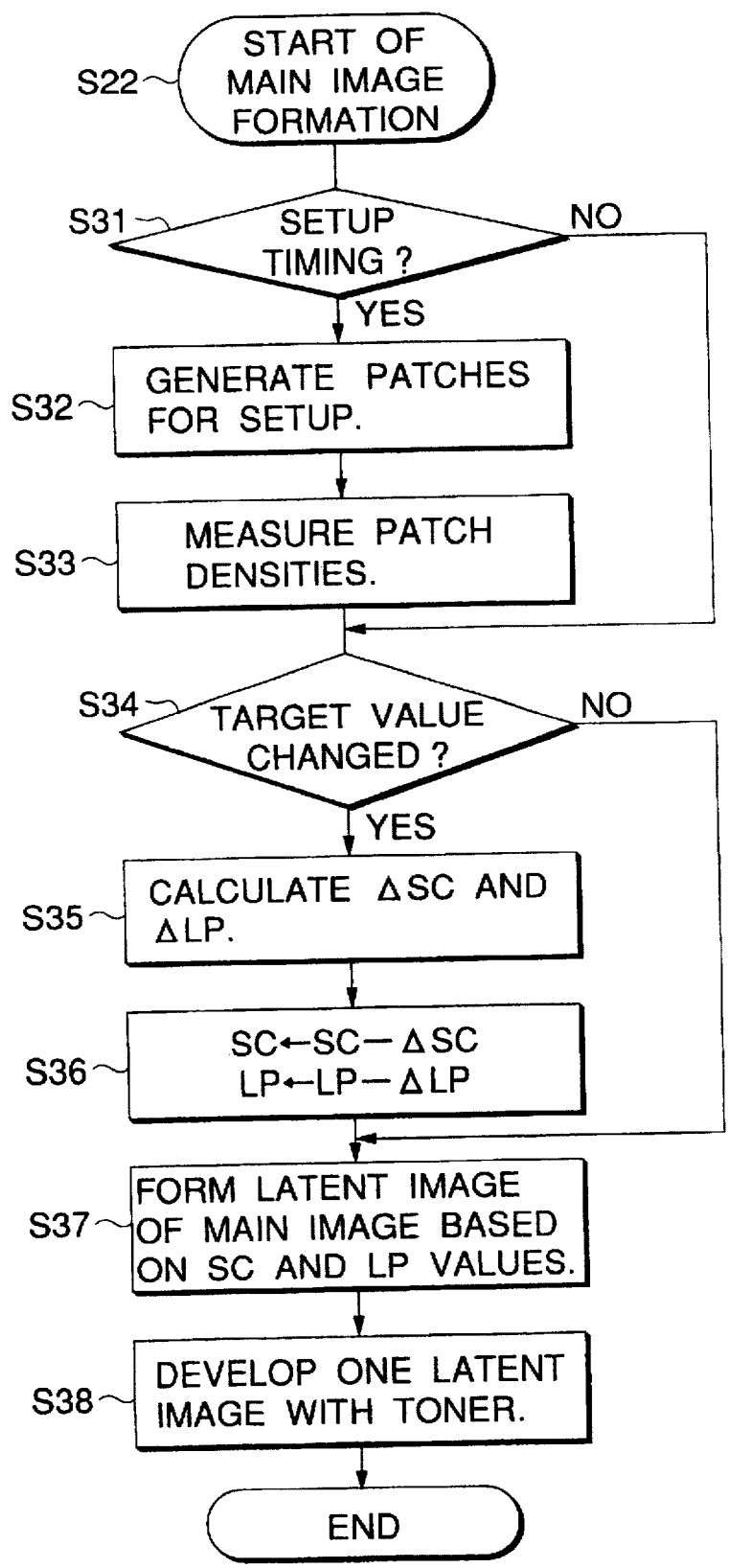
FIG. 13 is a flowchart showing a process for forming a main image in the basic operation of FIG. 12.

The main image forming operation (S22) is executed as shown in FIG. 13. First, it is checked whether the power has just been made on (S31). Since neither measured solid nor measured highlight density exists immediately after the power-on, a solid density patch and a highlight density patch for setup are formed. As the scoro and PL set values in this case, the values of the previous control (that is, the control just before the power-off) may be used, or a default value may be used. Then, the densities of the formed solid density patch and highlight density patch are measured by a sensor (S33).

Next, it is checked whether the density target value is changed by a user or not (S34). If not, then the latent image of the main image is formed by use of the current scoro and LP set values (S37), and the latent image is developed with a toner (S38). If the target value is found changed, then the solid density and highlight density that correspond to their respective target values are computed and differences $\delta$ D100 and $\delta$ D20 between the thus computed solid density and highlight density and the previously measured solid density and highlight density are found. The control rule that is applied to the current status is expressed by the following expressions:

$$\Delta D100 = a1 \cdot \Delta LP + a2 \cdot \Delta SC$$

$$\Delta D20 = b1 \cdot \Delta LP + b2 \cdot \Delta SC$$

By substituting previously obtained $\Delta D100$ and $\Delta D20$ into these expressions, $\Delta LP$ and $\Delta SC$ are obtained (S35). By subtracting thus obtained $\Delta LP$ and $\Delta SC$ from the current LP set value LP and scoro set value SC respectively, there can be obtained a new LP set value and scoro set value (S36). A latent image of the main image is formed in accordance with the newly obtained LP set value and scoro set value and the latent image is developed with a toner (S37 and S38).

Figure 14:
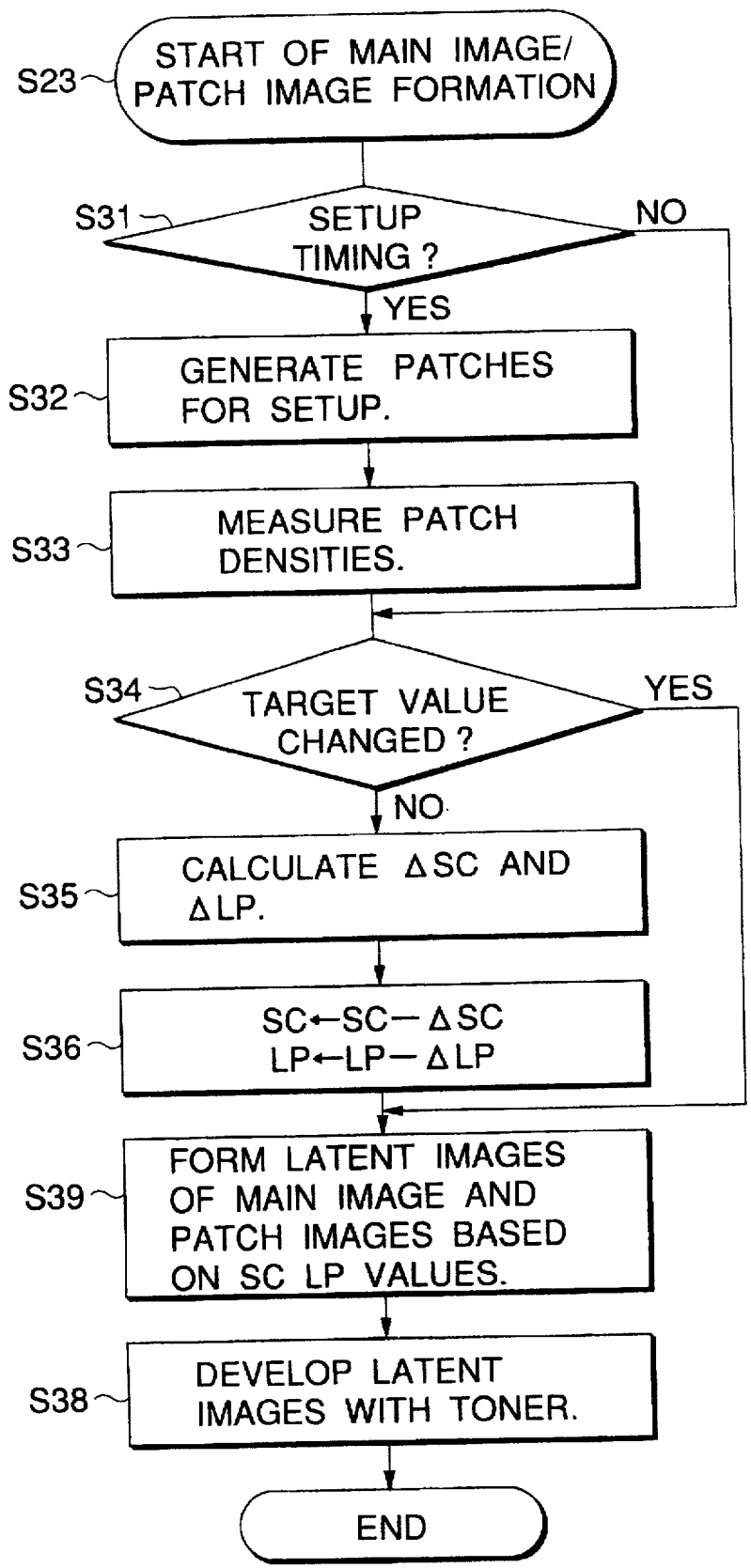
FIG. 14 is a flowchart showing a process for forming a main image and a patch image in the basic operation of FIG. 12.

The main image and patch image forming operation (S23) is shown in FIG. 14. This operation is almost the same as the operation shown in FIG. 13 and, therefore, in this operation, the steps thereof corresponding to the steps of the operation of FIG. 13 are given the same numbers and thus the detailed description thereof is omitted here. In short, in the operation to form the main and patch images (S23), the latent images of not only the main image but also the patch image are formed in Step 39.

Figure 15:
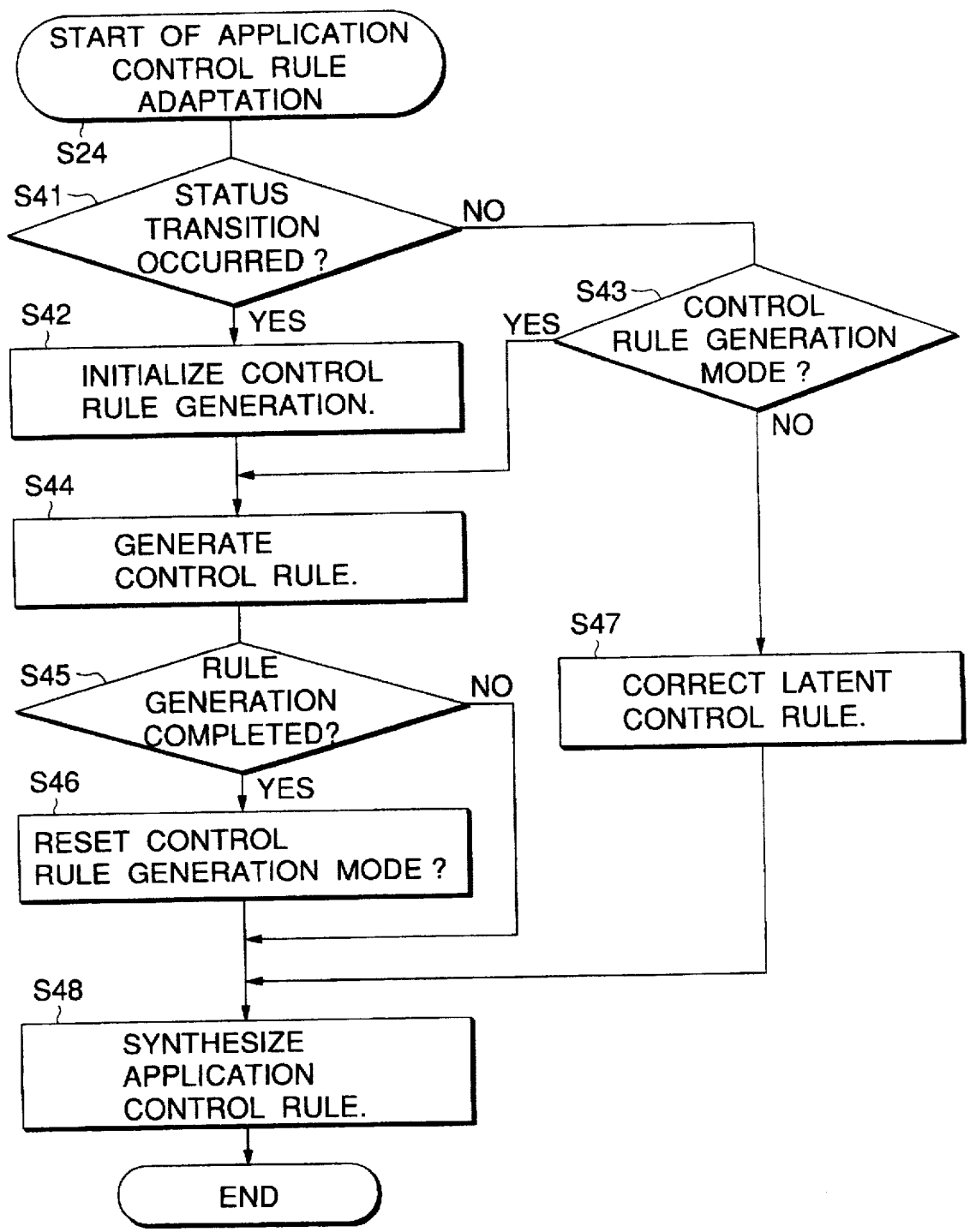
FIG. 15 is a flowchart of a process for adapting an application control rule in the basic operation of FIG. 12.

The application rule adapting operation, as shown in FIG. 15, includes a newest control rule correcting operation (S47) for correcting the newest control rule corresponding to the current status, a control rule generating operation (S42) for, after the status is changed, generating a new control rule corresponding to a new status, and an application rule synthesizing operation (S48) for synthesizing an optimum control rule from one control rule or a plurality of control rules that are currently stored.

In FIG. 15, first, it is checked whether the status of the image forming apparatus main body is changed or not (S41). Whether the status of the image forming apparatus main body is changed or not is judged in accordance with the time of the image formation and the cumulative number of image prints formed. When a given time has passed, or after a given number of image prints have been formed, there is a high probability that the status of the image forming apparatus main body has been changed and, therefore, these values can be used as substitute. Alternatively, this judgement can be made in accordance with the concrete status quantity of the image forming apparatus main body such as the temperature, humidity and the like, or other substitute values than the status quantity can also be used for this judgement.

If the status is found changed, then a rule forming operation (case data and the like stored) is initialized (S41 and S42). In a rule generation step S44, data on cases obtained after the change of the status are stored and, if there are stored data on a sufficient number of cases to generate a rule of a new status, then a new control rule is formed. If the control rule is formed, the rule generating operation is ended, and a control rule generation mode is reset (S45 and S46). If the status is found not changed, then it is checked whether the current operation is in the control rule generation mode or not (S43). If the current operation is found in the control rule generation mode, then the control rule generating operation is executed (S44). If the current operation is found not in the control rule generation mode, that is, when, after the status has changed, a new control rule corresponding to the status has been already formed, then an operation to correct the control rule is carried out (S47).

By means of the above operations, each time the status is changed, the control rule generating operation is initialized and, if a sufficient number of cases are stored during the continuation of the status, then a new control rule is generated. That is, normally, there are prepared a plurality of control rules. Alternatively, the greatest number of control rules may be preset and, after the greatest number of control rules are prepared, the control rules may be updated by a given rule.

The application rule synthesizing operation (S48) computes the adaptability of the current status and the adaptabilities of the respective control rules, weights the respective control rules according to the thus computed adaptabilities, and then combines together the weighted control rules to thereby synthesize an application rule to be applied to the next and following image generating operations. The adaptabilities can be selected, for example, in such a manner that they become greater as deviations between the densities of patches formed just before the current status and densities obtained when the scoro and LP set values in the patch forming operation are applied to the respective control rules become smaller.

For example, if the deviation of the solid density of a control rule Ri (i is a positive integer) is expressed as E100, i and the deviation of the highlight density thereof is expressed as E20, i, then the matching degree of the solid density w100, i and the adaptability of the highlight density w20, i can be expressed in the following manner:

$$w100, i=(1/E100, i)/(\Sigma (1/E100, j))$$

$$w20, i=(1/E20, i)/(\Sigma (1/E20, j))$$

where E means a sum with respect to j. Thus, the whole adaptability wi is obtained in this manner: wi=w100, i×w20, i. The sum of the adaptabilities wi is computed, and the adaptabilities of the respective control rules are divided by the thus computed sum to thereby find a normalized adaptability Wi.

Figure 16:
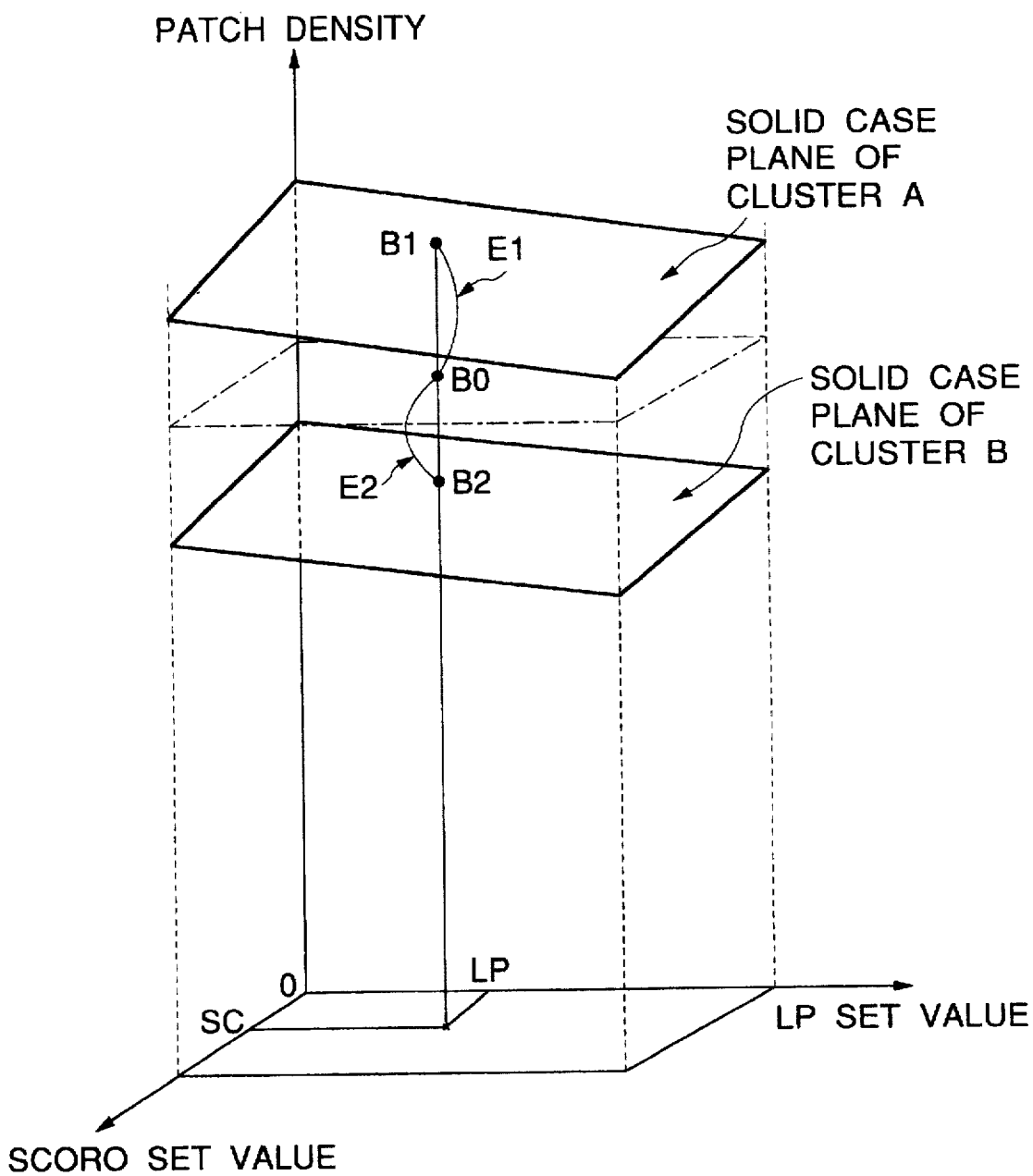
FIG. 16 illustrates the operation of FIG. 15.

FIG. 16 shows an example in which adaptabilities w100, i of solid case planes of clusters A and B are calculated. In FIG. 16, it is assumed that an actual solid patch density obtained when the current scoro and LP set values are respectively SC and LP is expressed as B0. Also, a corresponding solid patch density of the solid case plane of the cluster A and a corresponding solid patch density of the solid case plane of the cluster B are expressed as B1 and B2, respectively. Thus, deviations E100, 1 and E20, 2 are respectively |B0−B1| and |B0−B2|, respectively. Assuming that at the present time there exist only two clusters, calculation is made such that w100, 1=(1/=B0−B1|)/(1/IB0−B1|+ 1/IB0−B2|) and w100, 2=(1/IB0−B2|)/(1/IB0−B1|+1/IB0−B2|). Similarly, adaptabilities w100, 1 and w100, 2 of highlight densities are obtained, to thereby find the general or whole adaptabilities w1 and w2. By dividing the adaptabilities w1 and w2 by the sum (w1+w2), normalized adaptabilities W1 and W2 are obtained.

As described above, in the present embodiment, each time the status is changed, an operation to generate a new control rule suitable for the changed status starts and, if a sufficient number of cases are prepared, then a new control rule can be generated. Therefore, there is eliminated the need to collect various pieces of data to thereby cope with various conditions properly before the image forming apparatus is shipped, which makes it possible to reduce the cost of the image forming apparatus to a great extent. Also, in the present embodiment, since various kinds of control rules are synthesized together in accordance with the adaptabilities that correspond to the ever-changing conditions, it is possible to cope with various conditions even if the number of control rules is small. In this case, if control rules which correspond to typical statuses are previously input prior to the shipment of the image forming apparatus, then various statuses can be dealt with immediately. In the storage management of the control rules, if these typical control rules are previously processed in such a manner that they are not updatable, then there is no possibility that such typical control rules can be erased when a new control rule is registered.

(6) Detailed Control Flow of Adapting Operation of Application Control Rule

Next, a description will be given in detail of a flow for controlling the adapting operation of the application control rule (S24) with reference to FIGS. 17 to 22.

Figure 17:
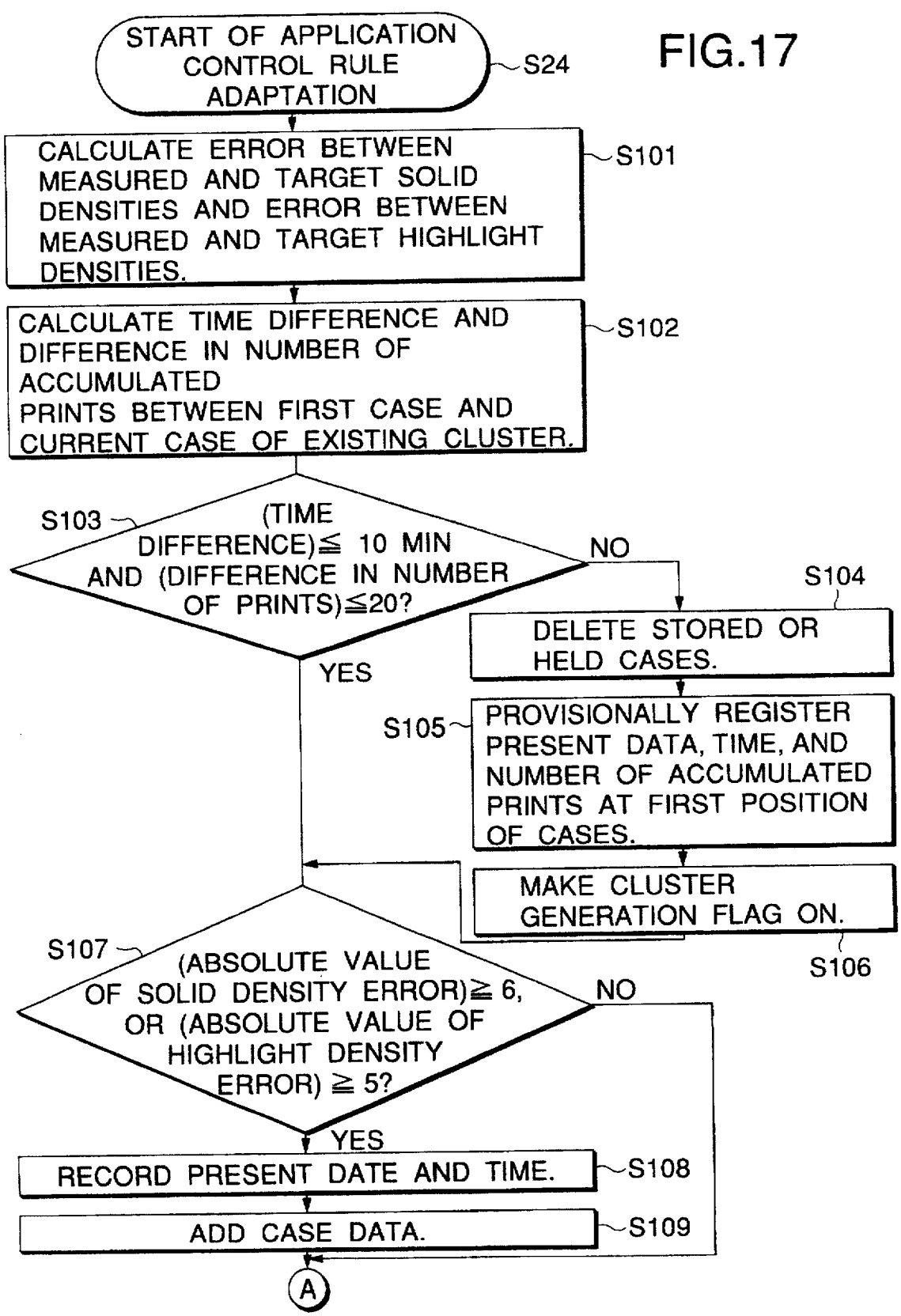
FIGS. 17 and 18 are a flowchart showing a more detailed version of the process of FIG. 15.
Figure 18:
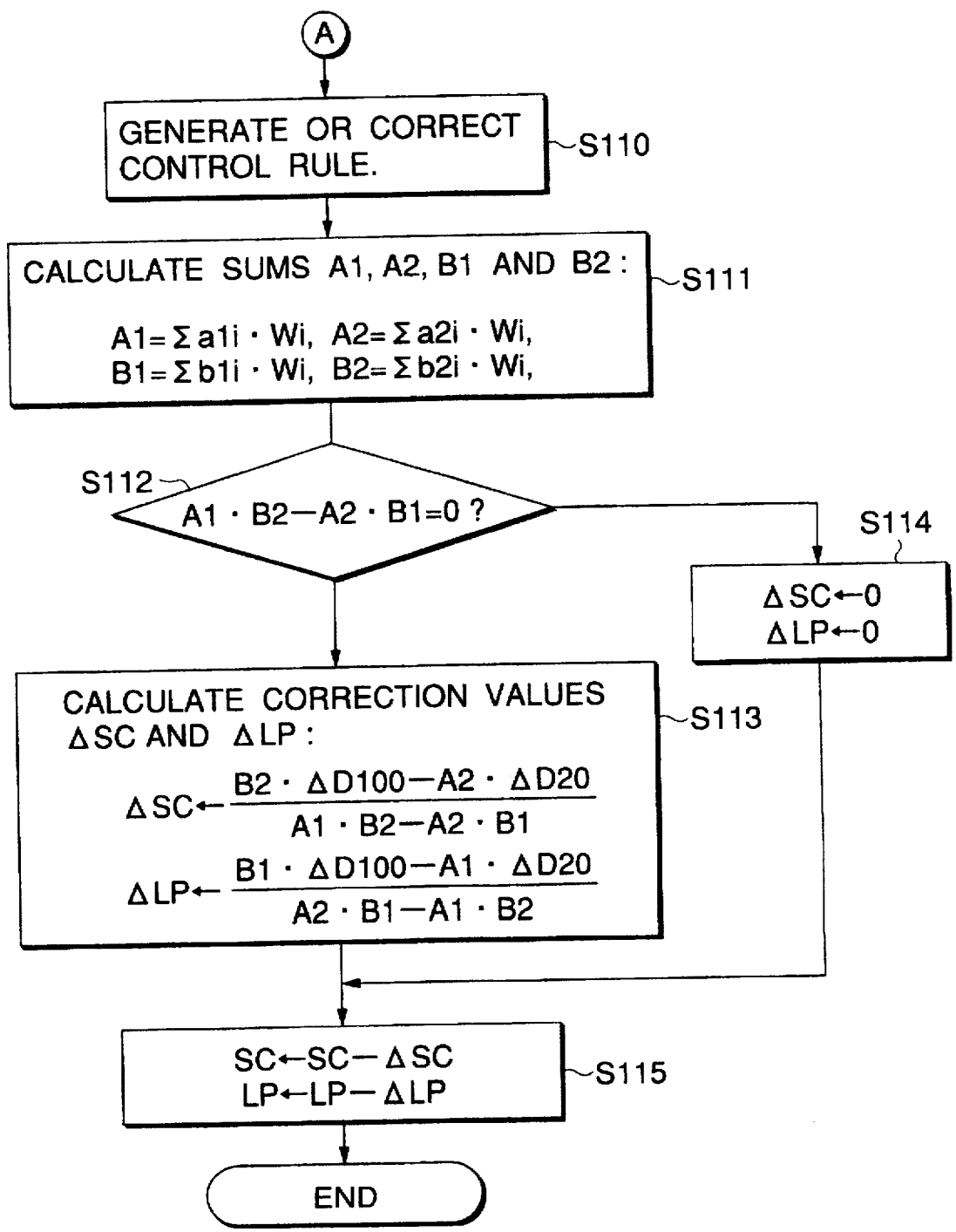

Firstly, a description will be given below of the whole flow of the adapting operation of the application control rule with reference to FIGS. 17 and 18.

[Step S101]

There is obtained an error E100 between a measured solid density a target solid density. Similarly, there is obtained an error E20 between a measured highlight density and a target highlight density.

[Step S102]

A difference between the time and the cumulative number of the previously stored first case and the time and the cumulative number of the current case.

[Step S103]

It is checked whether the time difference is within 10 minutes or not and whether the difference between the cumulative number is within 20 or not. If the time difference is found within 10 minutes and the cumulative number difference is found within 20, then it is judged that the status is not changed, and thus the processing goes to an operation to correct the current control rule. On the other hand, if the time difference exceeds 10 minutes, or if the cumulative number difference exceeds 20, then it is judged that the status is changed, and thus the processing moves to a mode for generating a new control rule (Steps S104, S105 and S106).

[Steps S104 to S106]

This is an operation for generating a new control rule upon detection of a status transition. To begin with, cases stored or held before the transition are erased (S104). Next, the current data, time and cumulative print number are provisionally registered in the first one of cases (S105). Then, a cluster generation flag is switched on (S106). Here, the term "cluster" means a group of cases which are detected in one status, and a control rule on this status is generated in accordance with the data on the cases that are contained in the cluster. The fact that the cluster generation flag is on indicates that the current processing is in a mode to generate a new control rule.

[Steps S107 to S109]

In these steps, if there occurs an outstanding case, this case is added as a case. Here, the term "outstanding case" means a case which must be taken into account in generating a new rule, or a case which must be taken into account in correcting the current control rule. In this instance, the outstanding case occurs when one of the current solid density error and the current highlight density error exceeds an allowable error. First, in Step S107, it is checked whether the current solid and highlight density errors are in the range of the allowable error. As the allowable error, the solid density is classified into 6 levels, while the highlight density is classified into 5 levels. If the density error exceeds the allowable error, then the current data and time are recorded and, after the data of the cases are stored (S108 and S109), the processing advances to a control rule generating and correcting step S110. The recording of the data on the cases will be described later in detail with reference to FIG. 19. On the other hand, if the error is in the allowable error range, then the processing advances to the control rule generating and correcting step S110 without performing any other processing.

[Step S110]

In the control rule generating and correcting step, if the status is changed, then a new control rule is generated. On the other hand, if the status is not changed, then a control rule formed in connection with this status is corrected. Also, the adaptability on the control rule is computed. The details of the control rule generating and correcting operation will be described later with reference to FIGS. 20 and 21.

[Step S111]

The coefficients a1, a2, b1, and b2 of all control rules Ri are multiplied by the adaptability Wi of the control rules to thereby find sums A1, A2, B1 and B2, and these sums are employed as the coefficients of an application control rule. That is, the correction values $\Delta SC$ and $\Delta LP$ of the operation quantities are found based on the deviations $\Delta D60$ and $\Delta D20$:

$$\Delta D60 = A1 \cdot \Delta SC + A2 \cdot \Delta LP$$

$$\Delta D20 = B1 \cdot \Delta SC + B2 \cdot \Delta LP$$

If these expressions are solved with respect to $\Delta SC$ and $\Delta LP$, then there are obtained the following expressions:

$$\Delta SC = (B2 \cdot \Delta D60 - A2 \cdot \Delta D20)/(A1 \cdot B4 - A2 \cdot B1)$$

$$\Delta LP = (B1 \cdot \Delta D60 - A1 \cdot \Delta D20)/(A2 \cdot B1 - A1 \cdot B2)$$

where $A1 = \Sigma a1i \cdot Wi$, $A2 = \Sigma a2i \cdot Wi$, $B1 = \Sigma b1i \cdot Wi$, and $B2 = \Sigma b2i \cdot Wi$, while $\Sigma$ means a sum with respect to i.

[Steps S112 to S114]

It is checked whether a correction value can be obtained or not (S112). That is, if the value of $A1 \cdot B2 - A2 \cdot B1$ is 0, namely, when the solid and highlight density planes of the synthesized application control rule are parallel to each other, solutions of $\Delta SC$ and $\Delta LP$ cannot be obtained; therefore, the correction value is set at 0 and the previous scoro and LP set values are used as they are (S114). On the other hand, when solutions can be obtained, $\Delta SC$ and $\Delta LP$ are found from the above expressions (S113).

[Step S115]

The scoro and LP set values are corrected by using the thus obtained ΔSC and ΔLP.

Figure 19:
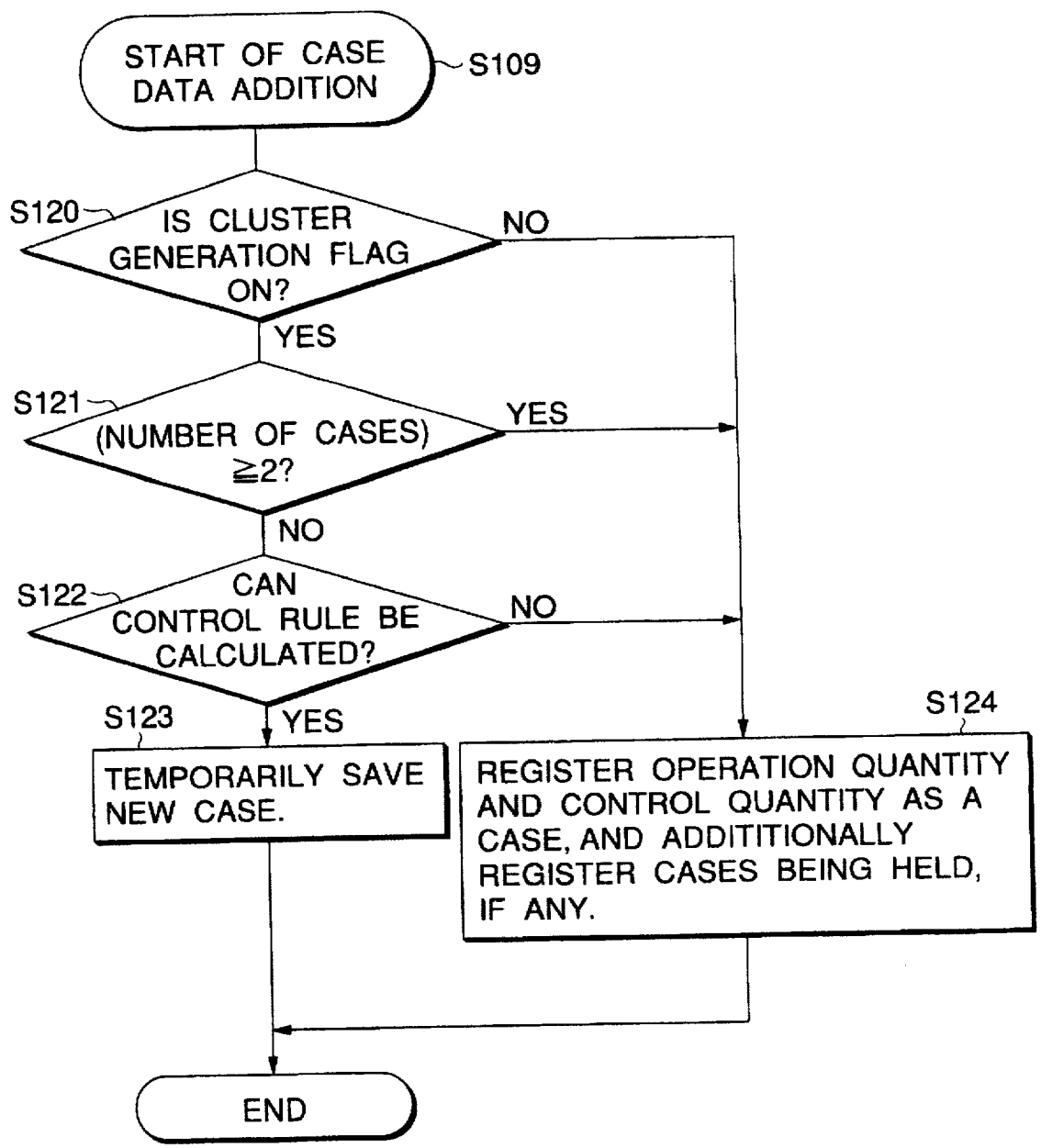
FIG. 19 is a flowchart showing details of a case data adding process in the process of FIG. 17.
Figure 20:
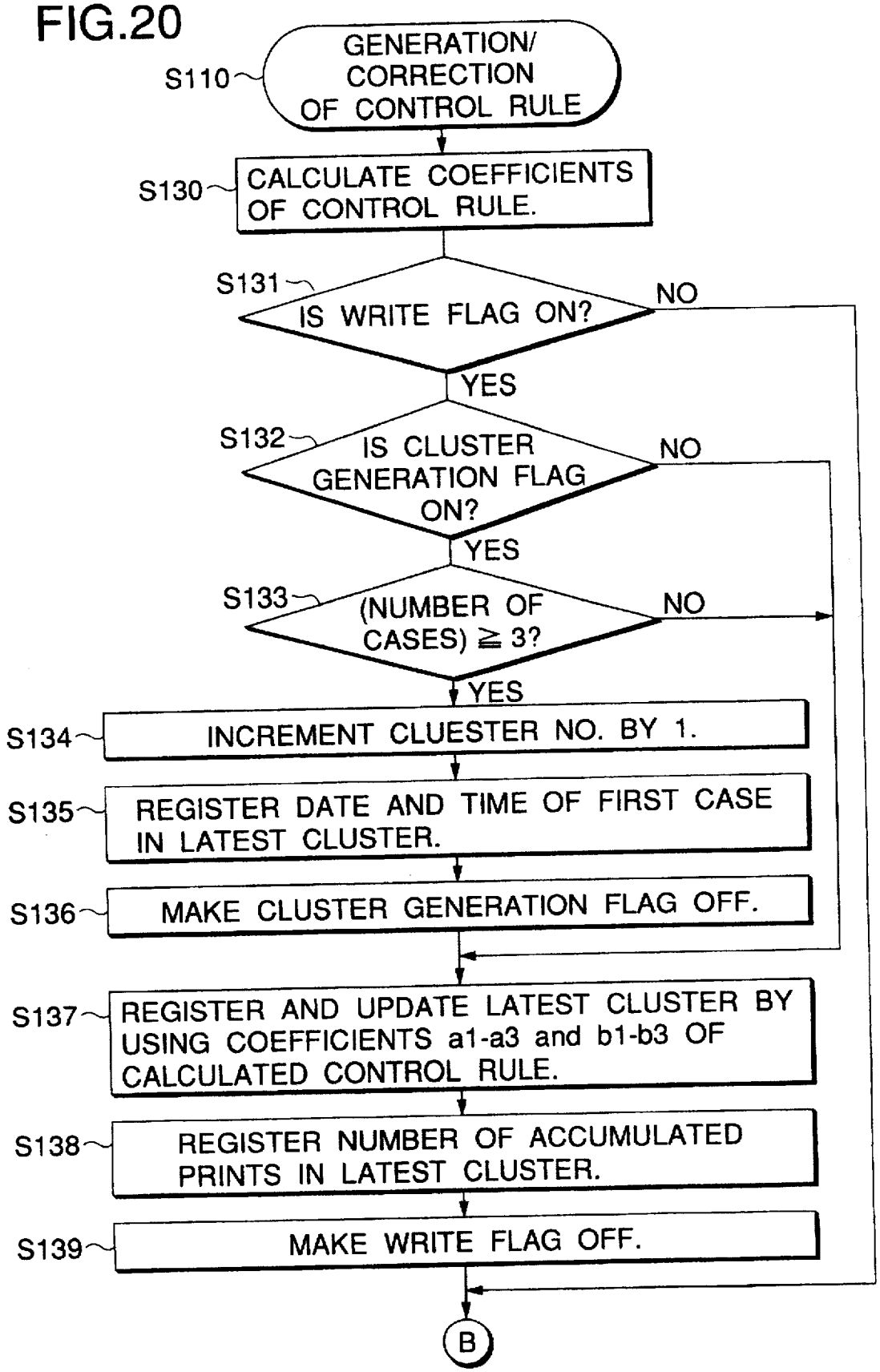
FIGS. 20 and 21 are a flowchart showing details of a control rule forming/correcting process in the process of FIG. 18.
Figure 21:
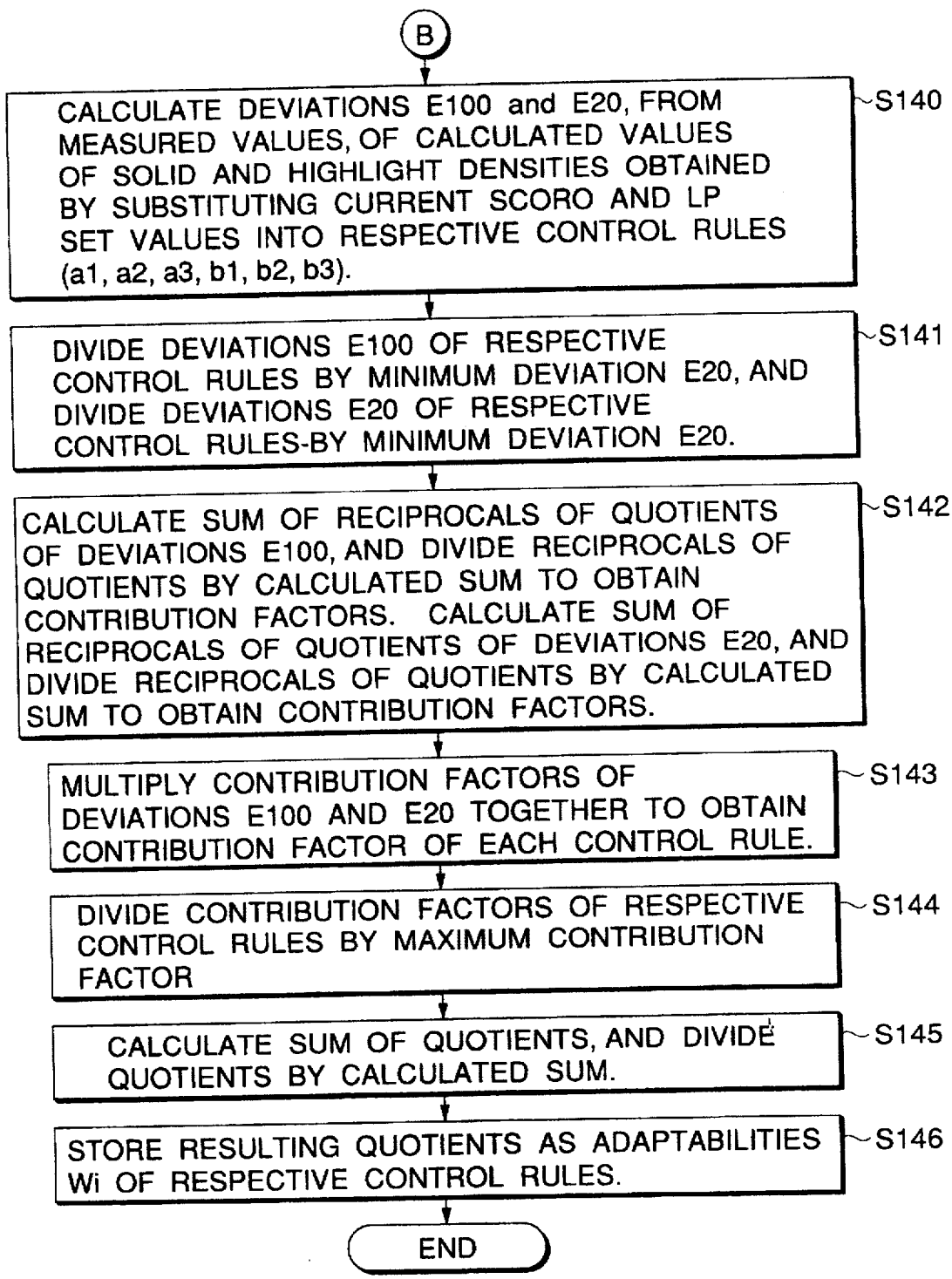

Next, a description will be given below of an operation (S109) to store the data on the outstanding case with reference to FIG. 19.

[Step S120]

It is checked whether the cluster generation flag is on or not. When the cluster generation flag is off, namely, when the status has not been changed, if data of an outstanding case is obtained, then the outstanding case is stored and used to correct a control rule for the current status.

[Steps S121 and S122]

If the cluster generation flag is on, it is checked whether the number of the outstanding cases stored so far is two or more, or not (S121). If the number of the cases is less than 2, then the processing goes to Step 124, in which the data on the cases are stored. If the number of the cases is two or two, then the processing goes to Step 122, in which it is checked whether a control rule can be computed or not. In the present embodiment, normally, a control rule can be generated if three cases are present. However, when the data on the three cases are arranged on a straight line, a control rule plane cannot be defined and, therefore, the control rule cannot be computed. In such a case, a new case is not stored as a normal case but is stored as a holding case (S123). The data on the holding case can be used as supplementary data when the data on a sufficient number of cases to form a control rule are prepared afterward.

[Step S124]

An operation quantity (scoro and LP set values) and a control quantity (solid and highlight densities) are recorded. Also, the number of cases recorded is incremented by 1. If there is present a holding case, then it is registered additionally.

The registration of the data on the outstanding case is carried out in the above-mentioned manner.

Next, a description will be given below of the control rule generating/correcting operation (S110).

[Step S130]

In the control rule generating and correcting operation, first, the coefficients of the control rule of the current status are computed. This will be described later in detail with reference to FIG. 22. If the current control rule has been newly generated or corrected, a write flag is set at 1 and, if not, then the write flag is set at 0 (see Step S153 shown in FIG. 22).

[Step S131]

It is checked whether the write flag is on or not. If it is found on, which means that a new control rule has been generated for the current status or the previous control rule has been corrected for the current status, different operations are performed for the formation of the new control rule and the correction of the previous control rule. If the write flag is off, then the processing advances directly to Step S140 without performing any other operation.

[Step S132]

It is checked whether the cluster flag is on or not. If on, that is, if a hew control rule is to be generated, then the processing goes to Step S133. If the cluster flag is off, that is, if the previous control rule is to be corrected, then the processing advances directly to Step S137.

[Step S133]

It is checked whether the number of outstanding cases is three or more, or not. If it is less than three, then a new control rule cannot be formed and thus the processing goes to Step S137. If the number of outstanding cases is three or more, then a control rule can be formed and thus the processing advances to Step S134.

[Steps S134 to S136]

In Step S134, the cluster number or the rule number is incremented by 1. Next, in Step S135, the date and time of the first case in the cluster are registered into the newest cluster (control rule) and further, in Step S136, the cluster flag is switched off.

[Steps S137 to S139]

The newest cluster (the newest control rule) is registered and updated using a control rule calculated in a rule calculating step (S137). Then, the cumulative number is registered into the newest cluster and the write flag is switched off (S138 and S139).

[Steps S140 to S146]

In this series of steps, for a plurality of control rules, their adaptabilities are obtained and an application control rule is synthesized according to the thus obtained adaptabilities. If there exists only one control rule, then the control rule, as it is, is used as an application control rule. First, the current scoro and LP set values are applied to the respective control rules to thereby compute the solid and highlight densities of the respective control rules. Then, deviations between the thus computed solid and highlight densities and the actually measured solid and highlight densities are computed (S140). The deviation between the solid densities of each control rule is expressed as E60, while the deviation between the highlight densities is expressed as E20. Next, the deviation E60 between the solid densities of each control rule is divided by the smallest solid density deviation. Similarly, the deviation E20 between the highlight densities of each control rule is divided by the smallest highlight density deviation (S141). Then, there is obtained the sum of the reciprocals of the quotients with respect to the solid density deviations, and the reciprocals of the quotients are divided by the sum, i.e., normalized. These are referred to as the contribution factors of the respective control rules with respect to the solid densities. Similarly, with respect to the highlight density deviation, there is obtained the sum of the reciprocals of the quotients, and the reciprocals of the quotients are divided by the sum, i.e., normalized. These are referred to as the contribution factors of the respective control rules with respect to the highlight densities (S142). Then, for each of control rule, the contribution factors of the solid density and the highlight density are multiplied together, and the resulting product is considered a contribution factor of the control rule (S143). Next, the contribution factor of each of control rule is divided by the largest contribution factor, and the resulting quotient is divided by the sum of the quotients, i.e., normalized (S144 and S145). The thus obtained values are stored as the adaptabilities Wi of the respective control rules Ri.

In the above-mentioned manner, the adaptabilities of the control rules are computed and the application control rule is obtained. That is, the coefficients a1, a2, b1 and b2 of all control rules Ri are multiplied by the adaptabilities of the control rules to thereby obtain the sums A1, A2, B1 and B2, which are employed as the coefficients of the application control rule.

$$A1 = \Sigma wi \cdot a1i$$

$$A2 = \Sigma wi \Sigma a2i$$

$$B1 = \Sigma wi \Sigma b1i$$

$$B2 = \Sigma wi \Sigma b2i$$

where $\Sigma$ is a sum with respect to i.

Figure 22:
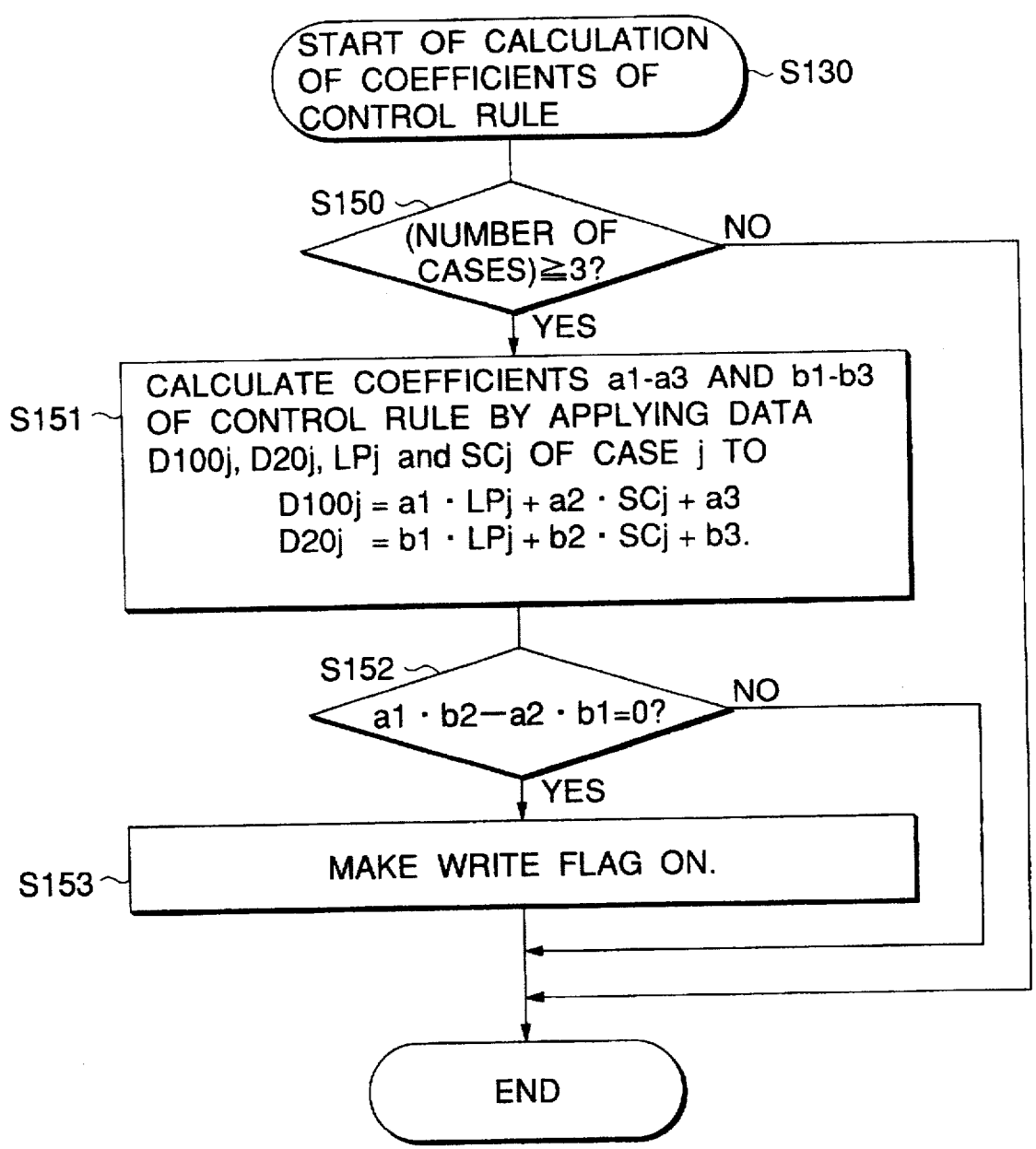
FIG. 22 is a flowchart showing details of a process for calculating coefficients of a control rule in the process of FIG. 20.

Next, a description will be given below of a control rule coefficient computing operation (S130) with reference to FIG. 22.

[Step S150]

To begin with, it is checked whether there are present three or more pieces of case data or not. If the number of the case data is less than 3, then it is impossible to compute the coefficients of a control rule and thus the computing processing is ended. If the number of the case data is three or more, then the processing goes to Step S151.

[Step S151]

The optimum control rule coefficients a1, a2, a3, b1, b2 and b3 are computed according to the method of least squares.

[Step S152]

It is checked whether a1·b2−a2·b1 is 0 or not. If it is 0, then the control planes are parallel to each other and thus the scoro and LP set values cannot be computed and, therefore, without employing the coefficients of such control rule, the control rule computation is ended.

[Step S153]

If a1·b2−a2·b1 is not 0, then these coefficients can be employed as the coefficients of the control rule and, therefore, the write flag is switched on to thereby end the control rule coefficient computing operation.

(7) Advantages of Embodiment 2

(a) In this embodiment, by using the above-mentioned control cases, there can be realized a control method which does not use other physical quantity sensors than the density sensor and is independent of the previous data collection and the analysis thereof by engineers. This can reduce the number of sensors used and man-hours necessary for development, which in turn can reduce the manufacturing cost of the image forming apparatus. On the other hand, according to the prior art, since there is employed a control method based on a physical mechanism, when trying to perform a similar control operation to the present embodiment, physical quantities such as a charged potential, an exposure light potential and the like are monitored by a potential sensor or the like, a developed potential (a difference between the exposure light potential and a developing bias) and a cleaning potential (a difference between the charged potential and the developing bias) are obtained from the thus monitored physical quantities and the developing bias set values, the optimum developing potential for realizing the target solid density is computed according to a relationship between the previously data collected solid density and the developing potential, a variation in the highlight density caused by changing the developing potential into the optimum developing potential is computed, and a highlight density error to be corrected with the highlight density variation taken into account is computed according to a relationship between the previously data collected highlight density and the cleaning potential, thereby determining the charging potential and exposure light potential. In accordance with not only a relationship between the previously data collected charging potential and the scoro set value but also a relationship between the exposure light potential to be applied to the last-mentioned charging potential and the LP set value, LP and scoro set values to be set in the next image forming operation must be determined. Also, the previously data collection must be executed under various temperature and humidity environments since the electrophotographic system depends on the temperature and humidity.

(b) In the present embodiment, with respect to the status that the image forming apparatus is encountering, a substitute value (a sampling time) can be used for the status quantity and, therefore, it is not always necessary to sense the status quantity. This means from the viewpoint of the physical mechanism for image formation that even an entirely black box can be controlled. That is, it can be well said that the present invention can also apply effectively in other systems than the electrophotographic system.

Also, as another operation of the present embodiment, it is possible to employ an arbitrary parameter as a controlling actuator. That is, according to the prior art, there are present parameters which cannot be detected due to no existence of a proper sensor or cannot be used from the viewpoint of costs. However, the present invention is able to deal with its set values directly and, therefore, it is able to select the set values or such parameters arbitrarily and use them for control.

(c) Further, as described before, simply by inputting a sufficient number of cases to determine the control planes, the present embodiment can be set up (initialized). That is, the present embodiment provides an action that there is eliminated the need for provision of special technology and devices necessary to set up or initialize the image forming apparatus. According to the present embodiment, there can also be provided another action that, even if the cases happen to deviate greatly from their respective target densities, such deviation has no ill effect on the control performance of the image forming apparatus. This is because the present image forming apparatus per se is always able to extract the control rule that matches a new cluster, namely, a new status as the occasion demands.

Referring to the comparison of the above action with the prior art, for example, in a conventional control rule learning technique based on a neural network, if there are not prepared the optimum data as teachers' data, then the reasoning performance of the neural network is impaired and additional learning and re-learning cannot be carried out automatically, so that a sufficient control performance cannot be obtained. Or, in another conventional technique based on a fuzzy theory, if a trial-and-error tuning operation by an engineer is not carried out in the most suitable manner, then a sufficient control performance cannot be obtained. These comparisons show that the action of the present embodiment is far better than the conventional techniques.

Further, in the present embodiment, even if the image forming apparatus encounters for the first time such a status that it has never experienced, it is able to extract a new control rule adaptable to such environment or status simply by carrying out a given number of printing operations and, if the image forming apparatus encounters a similar environmental condition after then, then it is able to cope with or control such environmental condition immediately. Therefore, the present image forming apparatus can deal with the change of the status with the passage of time without collecting data previously. That is, even if the status change with the passage of time occurs, the present image forming apparatus can always continue to follow the changing status.

This action provides a great effect that there is completely eliminated the need to perform a conventional developing operation in which scores of thousands of or hundreds of thousands of printing operations must be executed to collect previous data on the changes with the passage of time.

Also, according to the prior art, even the thus collected data on the changes with the passage of time cannot be always used effectively in all of image forming apparatuses because the image forming apparatuses are different from one another. Further, according to the prior art, there is left another problem to be solved: since a user uses the image forming apparatus under a different condition from the previous data collected condition by a maker, namely, since the image forming apparatus is used under such condition that is not expected by the maker, there occur such changes that are different from the maker's expected changes with the passage of time, which makes the control rule unapplicable, so that the image density cannot be controlled to a desired value. On the other hand, according to the invention, there are eliminated the previous data collection and any special means for the inter-apparatus difference, and, there can be provided an action which is able to cope with every image forming apparatus individually and perfectly under any users' environments to thereby solve the density variations caused by the changes with the passage of time.

From this action, there is also obtained another action: for example, even when element parts such as a photoreceptor, a developer and the like having significant influences on the image density are replaced, a desired image density can be automatically obtained in correspondence to the new element parts simply by executing a given number of printing operations.

This is an operation which, according to the prior art, has been performed by an operator such as a service engineer and, therefore, according to this aspect of the present embodiment, there can be provided a labor cost reducing effect. Also, according to the present embodiment, even if an ordinary user, not an expert such as the service engineer, replaces the parts, the optimum image forming status can be obtained automatically. That is, the present embodiment can be handled easily by everyone.

Moreover, according to the present embodiment, there is provided another action in which, when coping with the new condition in the above-mentioned manner, by using a concept "adaptability" in a plurality of past clusters, the new control cases need not be always stored. That is, due to this action, the present embodiment is able to deal with the new condition immediately without waiting for the completion of a given number of printing operations, or with no need for provision of a memory which stores new control cases additionally.

(d) In this embodiment, if the elapsed time and the cumulative number of prints are respectively within given ranges, then the status is judged to be left unchanged and thus newly obtained cases are used to correct the control rule of the current status. That is, if substantially physical changes have not occurred but the adaptability of the control rule has not been good simply due to the poor accuracy (such as large measurement error) of the past cases, then it is more effective to use together the past and new cases to thereby reduce the effects of the measurement errors that the individual cases statistically have. For example, it can be expected that a more accurate control rule can be expected by applying a statistical computation method such as the method of least squares or the like to a larger number of cases to thereby reduce the errors rather than by determining the control case planes from a given number of cases. On the other hand, if the elapsed time and the cumulative number of prints respectively exceed the given ranges, then the status is judged to have changed and thus a control rule on a new status can be formed using the cases obtained.

Employment of the control case depends solely on whether the control result of thereof obtained by using the control case planes satisfy the above-mentioned allowable error. That is, if the result of the control case satisfies the allowable error, then it is considered that there has been obtained a control rule which is capable of a sufficiently accurate control. If it does not satisfy the allowable error, then it is judged that it is necessary to increase the control cases in number to thereby enhance the accuracy of the control case planes.

As described above, in the present embodiment, if the status remains unchanged, then the current control rule is corrected using the cases; and, if the status has changed, then a control rule suitable for the new status can be newly generated. That is, a suitable control can always be carried out.

(e) Further, in this embodiment, there can be provided another action in which the control accuracy itself can be set arbitrarily. That is, the allowable error with respect to the target density can be set immediately and the improvement and correction of the control rule or the formation of a new control rule can be carried out in accordance with the set allowable error, so that necessary and sufficient control accuracy can be achieved automatically. Further, if there is obtained such necessary and sufficient control accuracy, then it is not necessary to store more control cases than necessary and too much memory capacity is not required.

(f) Still further, in the present embodiment, there is provided another action in which various control systems can be employed according to the characteristics and objects of the image forming apparatus since an arbitrary value can be used as the status quantity or its substitute value.

In other words, there is completely eliminated a conventional developing operation to build individual control algorithm even if the contents to be currently controlled are different from each other, for example, when the daily variations are to be controlled (the status quantity is classified by the data) or when the density variations mainly caused by the cycle-down/cycle-up are to be canceled (the status quantity is classified by the number of prints formed after a start button is depressed). Of course, even when trying to recognize the status by using a temperature sensor and a humidity sensor similarly to the prior art, the present embodiment can be applied as it is with no alteration.

(g) Yet further, according to the present embodiment, there can be provided another action in which the memory capacity can be used most effectively. That is, the data are erased automatically in the increasing order of importance or in the decreasing order of the storage time and, therefore, even if the memory capacity is limited, it is possible to achieve the control that matches the then status. Also, since the data on the cases are used only for correcting the newest control rule or generating a new control rule, only the data on the newest cluster need to be stored. For this reason, it is not necessary to store the data on the cases so much but a correspondingly larger number of control rules can be stored.

(8) Modification of Embodiment 2

The second embodiment can be modified in various manners as described below.

(a) In the above embodiment, the image output part IOT is a laser printer of a single color. However, the invention is not limited to this but the invention is also able to provide entirely the same effect even if a multi-color laser printer or a copying machine of an analog type is used as the image output part IOT. Further, the image output part IOT is not limited to the above-mentioned electrophotographic system but the invention can also be applied to an image output part of an ink jet system or other similar system.

(b) The sensor used in the present embodiment is just an example and, to obtain the effects of the invention, any other type of sensor can also be used, provided that it is able to measure the density of a developed patch. Also, as an object to be monitored, any object can be used, provided that it has a high correlation with the final image density; for example, any of a developed image, a transferred image and a fused image can be monitored, provided that it can be made to correspond to the final image density that is given to a user.

(c) In the above embodiment, as the density of the developed patch, there are employed two kinds of patch densities, that is, the solid (dot coverage of 100%) density patch and the highlight (dot coverage of 20%) density patch. However, the density of the developed patch is not limited to these two kinds of densities but, for example, only the density that corresponds to a dot coverage of 50% can be controlled, or, by using a larger number of patches, a larger number of gradation points can be controlled. However, when the respective gradation points are to be controlled independently of each other, it is necessary to prepare controlling parameters in such a number as corresponds to the number of the gradation points.

(d) In the above embodiment, the density of the developed patch is monitored. However, this is not limitative but the reproduced image density may also be monitored directly, or other physical quantity may also be monitored which can be used as a substitute for the developed patch density.

(e) In the above embodiment, the developing bias set value is used as a fixed value but, alternatively, the grid voltage set value of the scorotron charger and the developing bias can also be used as control parameters. This is because the developing bias also has a high correlation with respect to the solid density and highlight density. Therefore, as another combination, the grid voltage set value of the scorotron charger may be fixed, while the laser power set value and developing bias may be employed as control parameters.

Alternatively, it is also possible that the laser power set value, the developing bias set value and the grid voltage set value of the scorotron charger are used to control three gradation points. That is, for example, the dot coverage may be set as 100%, 50% and 20%.

(f) The above embodiment has been described on condition that the two-component developing system is used. In this case, the toner density in the developer, namely, the mixture ratio of the toner and carrier relates to the developing density, while the toner density is separately controlled to a generally given toner density according to a technique in which the quantity of supply of a toner is adjusted to be proportional to the pixel number of an image to be output. Or, as a further technique, the toner density may be controlled to such generally given toner density by monitoring it by use of a sensor of a magnetic type or an optical type which can be obtained on the market and has been conventionally used.

Also, in the present embodiment, since it is not necessary that the toner density is variably controlled positively to thereby control the image density to a desired value, it is sufficient that the toner density is maintained at the generally given toner density. This is because, even if the toner density varies a little, such variation can be absorbed by setting the above-mentioned parameters (scoro set value, LP set value).

On the other hand, when a one-component developing system is used, the toner density is always 100% and thus has no direct effect on the image density. Therefore, the toner density can be sufficiently controlled by a conventional toner quantity control technique such as a developer blind detection control technique or the like.

(g) In the second embodiment, as the status quantity, the time and the cumulative number of image formed prints are used. In this manner, as the status quantity relating to the image density, it is not always necessary that any physical quantity is sensed, but an arbitrary status quantity or a substitute value for the status quantity can be used according to the characteristics of the assumed image forming apparatus.

When there is room for the cost or the mounting space for the sensor, that is, when the temperature or humidity sensor is used to grasp the status quantity more accurately to thereby enhance the control performance, of course, a sensor for sensing another status quantity can also be provided as the occasion demands. Even in such case, it is not necessary at all to add a special processing or change to the present invention.

For reference, according to our experiments, even if the temperature or humidity sensor is not used directly, the control cases can be eventually classified according to the temperature variations or humidity variations and the control rules respectively corresponding to the control cases can be formed automatically. Therefore, when an ordinary image forming apparatus is used, it is not necessary to use a special temperature sensor or a special humidity sensor.

(h) In the second embodiment, the control case planes are used, while this is not limitative but, alternatively, instead of the planes, a curved surface (including a polyhedron as well) can be used. Next, a description will be given below of a control rule obtaining method which is different from the present embodiment. That is, instead of the above-mentioned "planes" obtained from the control cases, a "curved surface" higher in the degree than the plane can also be used.

Figure 23:
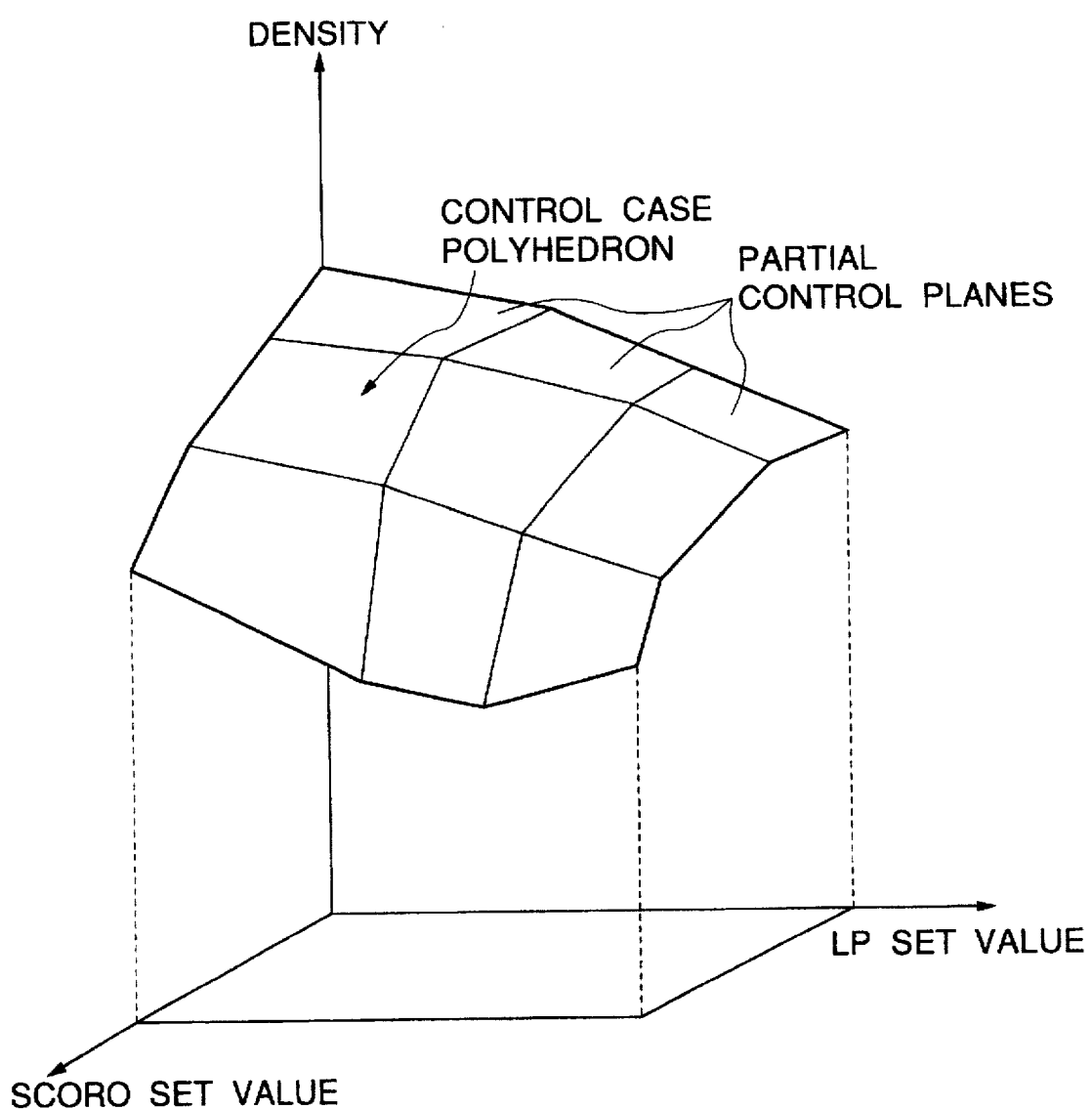
FIG. 23 shows an example in which a polyhedron is used as a control rule.
Figure 24:
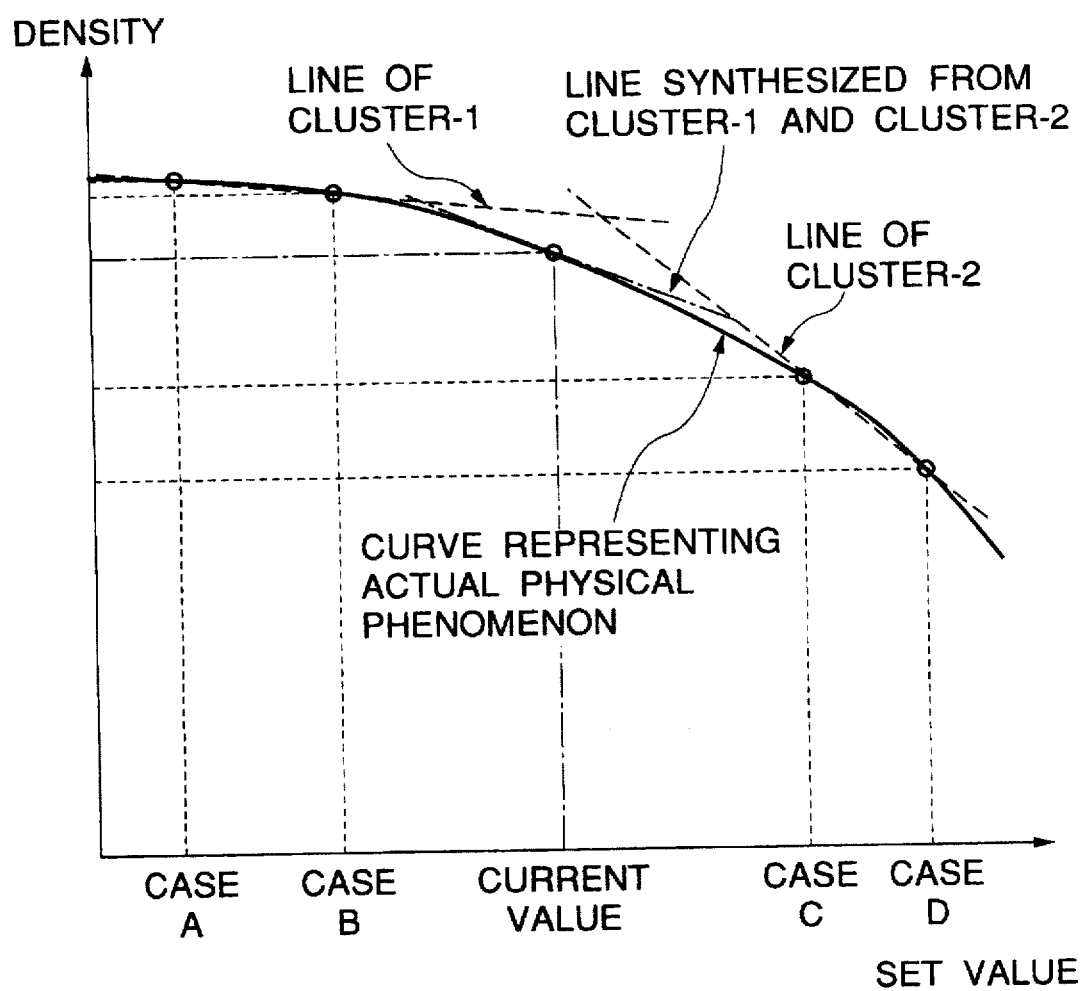
FIG. 24 shows an example in which a curved surface is used as a control rule.

When such a polyhedron as shown in FIG. 23 is used, the polyhedron corresponds to a case in which a plurality of control case planes are used with a certain condition given thereto. That is, only in the area that can be covered by a given control case plane, this plane is applied and, in the area that goes beyond the above area, another control case plane is applied. The application areas of the respective control case planes are alternatively allotted. Also, in FIG. 24, the polyhedron of the control case, for the purpose of easy understanding, is shown with the number of dimensions reduced by one (that is, a plane is expressed as a straight line, while a curved surface is expressed as a curved line). Generally, between a control rule and its adjoining control rule, synthesis is made according to the "adaptabilities" of these two control rules and, therefore, for example, at the just middle position of the two control rules, the adaptabilities of the two control rules are respectively 50%. Accordingly, planes respectively having an average inclination of the inclinations of the two control rules are formed virtually and are also moved parallel so that they can coincide with the actual physical phenomenon. In other words, the above description shows that the present control rule generating method is able to perform a control operation in the same condition as a smooth curved surface exists.

A control case curved surface is able to represent a plurality of control case planes or a control case polyhedron but, to obtain the control case curved surface, a larger number of control cases are necessary and thus it takes much time to form a control rule. For example, if a solid case curved surface is expressed as $a1 \cdot LP^2 + a2 \cdot LP + a3 \cdot SC + 4$, then there are obtained coefficients $a1$–$a4$ which minimize the sum of squares of $(a1 \cdot LP^2 + a2 \cdot LP + a3 \cdot SC + a4 - D60)$ with respect to the respective cases. The coefficients of the control case curved surface can be determined by use of a numerical analysis program.

As can be seen from the above description, there can be expected two kinds of control rule generating methods: in one method, a control rule is determined quickly by use of a simple plane and a large number of planes are combined together as the occasion demands; and, in the other method, from the beginning, a highly accurate control rule is expressed by a higher degree curved surface and the number of curved surfaces is reduced. Which one of the two methods is selected depends on what control characteristics are desirable to an image forming apparatus assumed or a user. The present invention can be applied to either of the two methods.

When the case control plane or curved surface is determined according to a statistical method, not only the mean square method but also other computing methods such as a mean method and the like can also be used.

(i) The developed patch can be formed and sensed entirely in the same manner as in the prior art and no special restrictions are necessary in constituting the present invention. That is, as in the conventional method, the patch may be formed each time an image is formed, or it may be formed only before or after a series of jobs. Or, the patch may be formed for each given number of prints or each given time.

Generally, the formation and detection of the patch is advantageous in that the reproduced status of the image density can be grasped more accurately as the patch forming frequency increases. However, it is also disadvantageous in that it consumes a larger quantity of toners. In view of this, the optimum patch forming frequency may be employed according to the specifications and objects of the image forming apparatuses used.

(j) In the memory management in second embodiment, the data are erased in a decreasing order of the storage time. However, with respect to the control rule, each time it is used for control, the adaptability thereof may be accumulated and whether the control rule is erased or not may be determined by use of the resultant cumulative adaptability. That is, since a control rule having a small cumulative adaptability is a control rule which is used with little frequency, the control rule may be erased in an increasing order of frequency of use.

Next, this erasing method will be described below in more detail. First, it should be noted here that, when judging the importance of the control rule, it is not always good to judge it only based on whether the control rule is new or old. The reason for this is as follows: since an image forming apparatus using an electrophotographic process is greatly influenced by the temperature and humidity environment, for example, when a relation between the image forming apparatus and the four seasons in Japan is taken into account, there is a possibility that, in performing a control operation in summer, a control rule extracted last summer can apply more effectively (that is, the control rule has been stored about one year) than a control rule extracted last winter (that is, the control rule has been stored about a half year).

Therefore, the importance of the control rule should not be judged simply based on whether the data on the control rule is new or old, but the control rule importance should be judged accurately according to some other suitable method. In view of this, each time the control rule is applied, the adaptability of the control rule is accumulated and the control rule importance is judged using the resultant cumulative adaptability.

However, in this case, if the control rule importance is to be judged only in accordance with the cumulative adaptability, then there arises a problem. That is, the newer a control rule is (it is not long after it is formed), the smaller the cumulative adaptability of the control rule is; and, the older a control rule is, the more frequently the control rule is used even if the control rule has an adaptability for each use (thus, even if the importance of the control rule is low), which increases a possibility that the cumulative adaptability of the old control rule can become large.

On the other hand, external environments such as temperature and humidity having a great influence on the image forming apparatus vary greatly according to the four seasons, especially in Japan. Therefore, it is desirable that the cumulative condition of the adaptabilities is taken into account over a period during which the similar environmental conditions of the season, in which the subject control rule is extracted, continue.

For example, it is assumed that a control rule has been existing 3 months in a similar environmental status to the status of the control rule at the time (in the season) when the control rule was extracted, and, among the control rules that have been existing three months or longer since they are formed, a control rule having the smallest cumulative adaptability is regarded as the control rule of the least importance and is thus erased. This way of erasing eliminates the possibility that only the newly extracted control rule can be erased thoughtlessly. That is, if a new control rule has been existing for 3 months or less since it was extracted, then new control rule is usually a rule of less frequency and of a small adaptability but, however, according to the above way of erasing, there is eliminated the possibility that such new control rule can be erased thoughtlessly.

Referring in more detail to this way of erasing, if a control rule is expressed by a primary approximation according the least square method, then the elements of a control rule (or cluster) are stored in such a manner as shown in FIG. 25. That is, the elements of a control rule shown in FIG. 25 includes coefficients a1, a2, a3, b1, b2, and b3 to approximate the solid and highlight densities as follows:

$$(\text{solid density}) = a1 \times (\text{LP set value}) + a2 \times (\text{scoro set value}) + a3$$

$$(\text{highlight density}) = b1 \times (\text{LP set value}) + b2 \times (\text{scoro set value}) + b3$$

The elements further includes the year, month, date, hour, minute, and second at which the control rule is formed, that is, the time of occurrence of the last (the newest) control case of a group of control cases from which the present control rule is extracted, and the cumulative adaptability. Each time the control rule is used for control and the adaptability thereof is computed, the thus computed adaptability is added to the cumulative adaptability.

FIG. 25 corresponds to FIG. 7 and shows an example in which control rule-1 is extracted from cases 1–3 and control rule-2 is extracted from cases 4–6.

Since the control rules (or clusters) are described according to the above technique, when the memory residual quantity is running short, first it can be checked, in accordance with the year, month, date, hour, minute and second of the extraction of the control rule, whether the control rule has existed for 3 months or longer or not. Next, if it is found that the control rule has existed for 3 months or longer, then the cumulative adaptability of the present control rule is compared with the cumulative adaptabilities of the other control rules that have been existing for 3 months or longer to thereby be able to judge the importance of the present control rule.

When the previously prepared memory capacity is small or when new control rules are formed very frequently, there is a possibility that the memory residual capacity can run short before the elapsed time of the control rule reaches 3 months. In this case, as described before, the control rule is erased simply in a decreasing order of the elapsed time. Therefore, in any case, according to the present embodiment, the image forming apparatus can be structured in such a manner that it can secure a memory for storing the newest data.

(k) When finding the adaptabilities of control rules and synthesizing them together in the control rule retrieval unit, a control rule having an adaptability which is less than a given value (10% or 20%) may be neglected, while the adaptabilities of the remaining control rules are obtained again and the thus obtained adaptabilities may be synthesized together for control of the image density. This way of controlling the image density is free from the influences of the control rules having little connection with the image density and, therefore, is able to carry out a more accurate image density control.

(l) In the above embodiment, the image density is the target to be controlled. However, this is not limitative but, for example, the line width, sharpness, gradation or the like may be employed as the target to be controlled.

Embodiment 3

(1) Background

First, a description will be given below of the background of a third embodiment of the invention. In the previously described second embodiment, the case collection time is employed as the status quantity. This is because factors that affect the status of a system to be controlled include various environmental conditions of the periphery of the system, changes with the passage of time, and the like but they can be considered almost constant in a limited range of time. For example, it can be considered that there is no substantial status changes between time points of a 20-minute interval, whereas there may occur considerable changes in temperature and humidity between morning and evening, yesterday and today, etc.

Therefore, when a control part or a system to be controlled is restarted after it was stopped, there may occur a case that the physical states of the system have changed considerably during the stop period when no control cases including status quantities are collected.

Generally speaking, such a situation can often be found in various control systems. For example, even if the external environment is constant, after a system to be controlled, which was once operated and thus the temperature thereof was raised, has been controlled under the raised temperature, in some cases, it is found that the temperature of the system is decreased down to the room temperature when it is restarted and thus the status of the system is quite different.

In such a case, in the second embodiment, if the system to be controlled is restarted and the target output of the system is designated, then the control part reads out a closest control case, that is, a control case just before a power switch is turned off, determines adaptabilities of the respective control rules from the density and operation quantity set value of the readout control case, weights and averages the respective control rules in accordance with the adaptabilities, to create (synthesize) a new control rule.

However, if the status of the system to be controlled just before the power switch is turned off is greatly different from the status after the power switch is turned off, then a control quantity obtained with respect to the previous operation quantity is quite different from the control quantity target value. That is, the adaptabilities are calculated and thus the new control rule is created based on the control case containing a great error. Of course, when the resultant control error exceeds the allowable value, as has been already described, the control accuracy in the next and its following controls can be enhanced by adding other control cases. However, if the initial error is great, then it takes much time until an allowable accuracy can be obtained.

In view of the above, according to the third embodiment, to obtain the first control case in the system restart time, an average value of an operation quantity set by a control case just before the power switch is turned off and a given standard operation quantity is calculated, and the thus calculated average value is set as the initial operation quantity. Due to this, even if the status of the system to be controlled just before the power switch is turned off is greatly different from the status of the system to be controlled when it is restarted, there can be eliminated the possibility that the initial error can be quite large.

(2) Configuration

Next, a description will be given below of the third embodiment with reference to FIGS. 26–30. In the third embodiment, the invention applied to a laser printer in which it is expected that the above-mentioned status changes at the time of a restart may occur.

Figure 26:
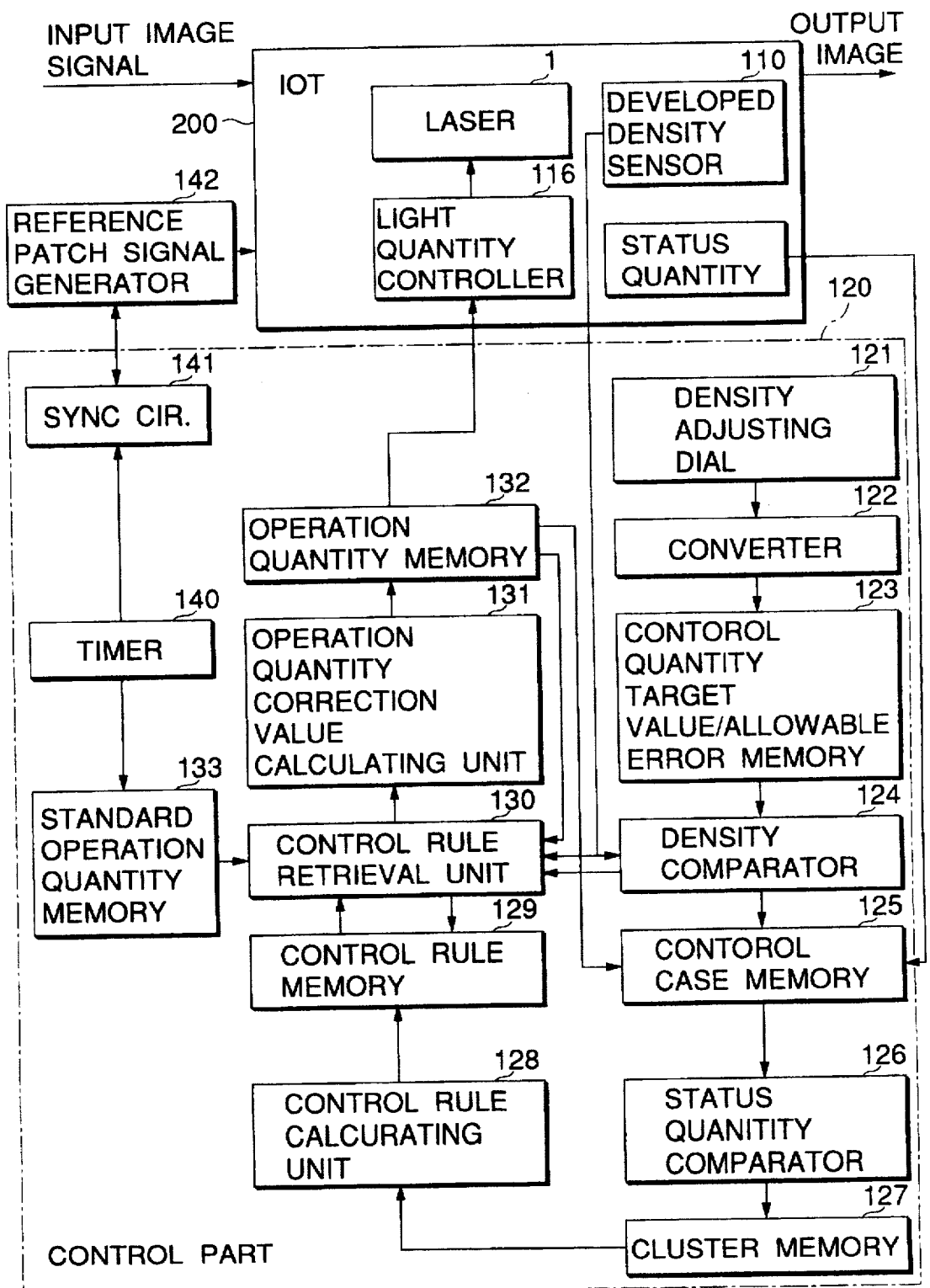
FIG. 26 is a block diagram showing the configuration of a control part in a third embodiment of the invention.

Now, in FIG. 26, reference numeral 200 designates an image output part of a laser printer which part is a system to be controlled in the present embodiment. Numeral 120 stands for a control part of the laser printer which part is used to control the laser output of the image output part 200 so that a developed image density can be made to coincide with a target density.

Also, numeral 121 designates a density adjusting dial on which an operator sets a value corresponding to a desired density. The set value of the density adjusting dial 121 is converted by a converter 122 to a value (such as a value in the range of "0"–"255") which is converted to the output of a developed image density sensor 110. A target density output from the converter 122 is held in a control quantity memory 123. In this case, the control quantity memory 123 stores an allowable error as well.

On the other hand, the output signal of the developed image density sensor 110 is compared with the output signal of the control quantity memory 123 in a density comparator 124. This comparison is made with reference to the allowable error stored in the control quantity memory 123. If a difference between the output signals is within the allowable value, then the output signal of the developed image density sensor 110 is supplied to a control rule retrieval unit 130 and, if the difference is greater than the allowable value, then it is supplied to a control case memory 125. However, in the restart time of the system to be controlled which will be described later, in order to calculate the adaptabilities of the respective control rules (see the second embodiment), whether the error is large or small, the output signal of the developed image density sensor 110 is supplied to the control rule retrieval unit 130. The control quantity target value of the density is output from the density comparator 124 to the control rule retrieval unit 130. In response, the control rule retrieval unit 130 outputs the control quantity target value of the density to an operation quantity correction value calculating unit 131.

A control case memory 125 is a memory which stores a control case, in particular, which stores a set of a status quantity, an operation quantity and a control quantity. The reason why the control case is stored in the control case memory 125 is that, as described above in the second embodiment, various kinds of control can be carried out in accordance with the control cases stored in the past.

Here, the status quantity to be stored in the control case memory 125 is the values of the temperature and humidity that have the dominant effects on the electrophotographic process, the operation quantity is the set value of the laser power (which will be hereinafter referred to as an LP set value) that changes the developed image density of a laser printer, and the control quantity is the output signal of the developed density sensor 110.

A status quantity comparator 126, a cluster memory 127, and a control rule calculating unit 128 refer to the control cases stored in the control case memory 125 to thereby extract a control rule.

A control rule memory 129 is a memory which stores a plurality of control rules calculated by the control rule calculating unit 128 and, on receiving a request from the control rule retrieval unit 130, sends back a control rule corresponding to the request. In this case, the control rule retrieval unit 130 requests a control rule, which corresponds to a density difference to be supplied from the density comparator 124 and an operation quantity (that is, an LP set value) to be supplied from an operation quantity memory 132, from the control rule memory 129.

Also, the control rule retrieval unit 130, in the restart time of the system to be described later, applies an operation quantity to be supplied from the operation quantity memory 132 to the respective control rules that are stored in the control rule memory 129, and calculates the adaptabilities of the respective control rules with respect to the detection results of the developed image density sensor 110 at the then time. The control rule retrieval unit 130 uses the calculated adaptabilities as "weights" to average the respective control rules with the weights to thereby create (synthesize) a new control rule.

The operation quantity correction value calculating unit 131 calculates a correction value for the operation quantity by use of a control rule retrieved or created by the control rule retrieval unit 130, and supplies the thus-calculated correction value to the operation quantity memory 132. In response, the operation quantity memory 132 supplies an LP set value corresponding to the operation quantity correction value to a light quantity controller 116.

A standard operation quantity memory 133 is a memory which stores an operation quantity to be set when the laser printer is in a so-called standard status (for example, in a medium-temperature and medium-humidity status in which each of the temperature and humidity is neither high nor low) (which operation quantity is hereinafter referred to as a standard operation quantity). The standard operation quantity stored in the standard operation quantity memory 133, when the laser printer is restarted (for example, when a power switch is turned off once and then the power switch is turned on again), is output to the control rule retrieval unit 130. A description will be given later of the operations of the control rule retrieval unit 130 and operation quantity correction value calculating unit 131. Here, the above-mentioned control case memory 125, control rule memory 129 and standard operation quantity 133 are all formed of non-volatile memory elements. The image output part 200 includes means for detecting the on/off of the power switch and, if it detects the restart operation of the laser printer by means of the on/off of the power switch, then the image output part 100 outputs a restart detection signal to the control rule retrieval unit 130.

A reference patch signal generator 142 outputs a reference patch signal for calibration to the image output part 200. Here, the calibration reference patch signal is a signal that is output as a dummy signal to generate a patch in a given area of a photoreceptor in which an input image is not exposed, in order that the developed image density can be detected by the developed image sensor 110. The operation timing of the reference patch signal generator 142 is synchronized with the control part 120 by a synchronizing circuit 141. Also, a timer 140 is used to supply a time clock signal to the above-mentioned standard operation quantity memory 133.

(3) Operation

Next, a description will be given below of the operation of the third embodiment having the above-mentioned structure. In the following description, as an example of the operation of the third embodiment, there is taken the operation of the laser printer when it is restarted after the power switch is turned off, in which it is assumed that the status (that is, the temperature and humidity) of the laser printer vary to a great extent.

First, after the power switch is turned off, if the power switch is turned on again and the control part 120 of the laser printer is thereby restarted, then the control rule retrieval unit 130 reads out the standard operation quantity from the standard operation quantity memory 133 and takes it in. Also, the control rule retrieval unit 130 reads out from the operation quantity memory 132 an operation quantity just before the power switch is turned off (which is referred to as "previous operation quantity"). That is, the retrieval unit 130 supplies the standard operation quantity and the previous operation quantity to the operation quantity correction value calculating unit 131. In response, the operation quantity correction value calculating unit 131 calculates an average value of the previous operation quantity and standard operation quantity that are both supplied from the control rule retrieval unit 130, and then outputs the calculated average value to the operation quantity memory 132. On receiving the average value from the operation quantity correction value calculating unit 131, the operation quantity memory 132 supplies an LP set value corresponding to the average value to the light quantity controller 116.

On the other hand, a calibration reference patch signal is output from the reference patch signal generator 142 in synchronization with the operation of the control part 120, so that a reference patch is generated in the photoreceptor. The developed image density at that time is detected by the sensor 110, and the output signal of the sensor 110 is supplied to the control rule retrieval unit 130. Responsive to this, the control rule retrieval unit 130 applies the operation quantity stored in the operation quantity memory 132 to the respective control rules and calculates the adaptabilities of the respective control rules with respect to the developed image density detected by the sensor 110, thereby creating (synthesizing) a new control rule.

Thereafter, by comparing the new control result (that is, the density difference) with the allowable error, it is judged whether the current control content should be stored additionally and, if the need arises, the control rule is corrected or a new control rule is created, thereby making preparation for the next control.

Figure 27:
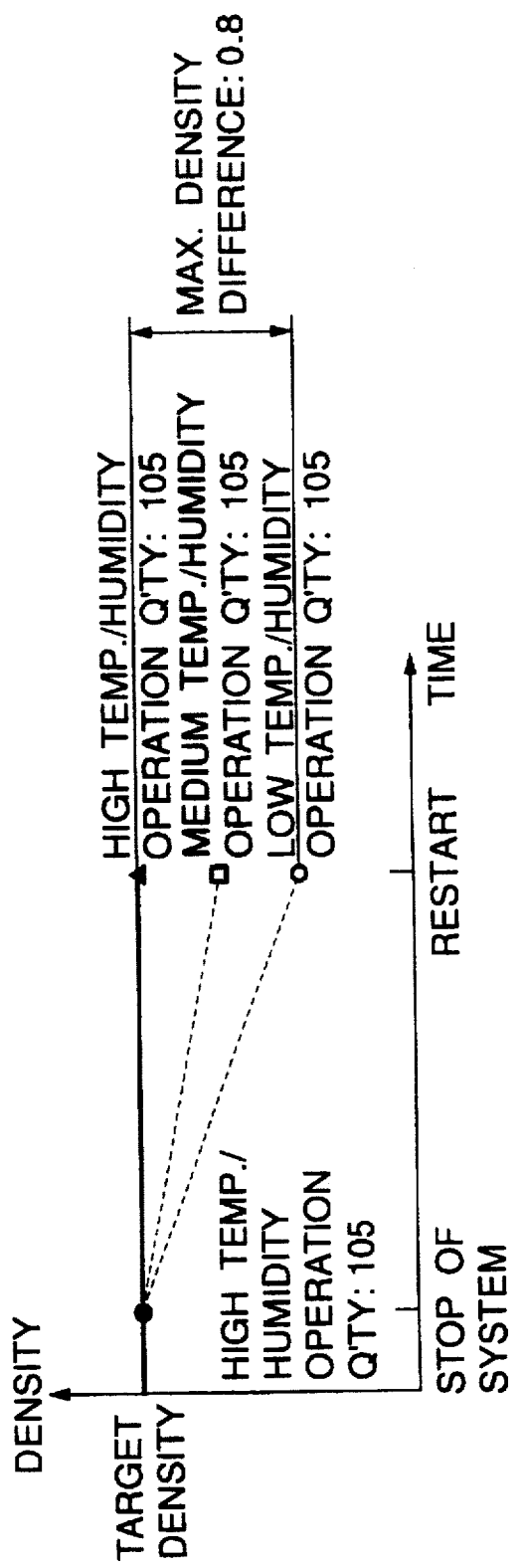
FIG. 27 is a graph showing a relationship between an operation quantity and a control quantity before and after a system to be controlled is restarted in a case where an operation quantity set value itself before the system is stopped is used as the operation quantity for an operation after the restart.

Here, with reference to FIGS. 27 to 30, a relationship between the operation quantity (LP set value) and the previous (that is, just before the power switch is turned off) control quantity (image density) obtained when the operation quantity set value ,as it is, is used as the operation quantity after the laser printer is restarted is compared with a relationship between the operation quantity (LP set value) and the previous control quantity (image density) obtained when, as in the third embodiment, the average value of the previous operation quantity set value and standard operation quantity is used as the operation quantity after the laser printer is restarted. In particular, FIG. 27 shows the former case, while FIGS. 28–30 show the latter case.

As shown in FIG. 27, in a case where the operation quantity set value "105" corresponding to the high temperature and high humidity in the previous control, as it is, is used as the operation quantity for the restart operation of the laser printer, if the status of the laser printer after it is restarted remains in the high temperature and high humidity status, then a density error is produced little but, however, if the status of the laser printer after it is restarted varies into the low temperature and low humidity status, then the density error becomes greatly large (the maximum density difference is "0.8").

On the other hand, as shown in FIG. 28, in a case where the average value "115" of the operation quantity set value corresponding to the high temperature and high humidity status in the previous control and the standard operation quantity "125" is used as the operation quantity after the restart operation of the laser printer, even if the status of the restart operation of the laser printer varies into the low temperature and low humidity status, the resultant error is not so large as in the above-mentioned case (in this case, the maximum density difference is "0.6"). Also, as shown in FIG. 29, in a case where the average value "125" of the operation quantity set value "125" corresponding to the medium temperature and medium humidity status in the previous control and the standard operation quantity "125" is used as the operation quantity of the restart operation of the laser printer, the maximum density difference is "0.4"; and, as shown in FIG. 30, in a case where the average value "135" of the operation quantity set value "145" corresponding to the low temperature and low humidity status in the previous control and the standard operation quantity "125" is used as the operation quantity of the restart operation of the laser printer, the maximum density difference is "0.6". That is, in either of the last-mentioned cases, the error is not so large as the above-mentioned first case.

As described above, according to the third embodiment, due to the fact that, in order to obtain the first control case in the restart operation of the laser printer, an average value of the standard quantity and the operation quantity set in a control case just before the power switch is turned off is calculated and the thus calculated average value is set as an initial operation quantity for the restart operation of the laser printer, even if the status of the laser printer just before the power switch is turned off differs greatly from the status in the restart operation thereof, an initial error is not large so much, which makes it possible to select and synthesize a control rule according to the proper adaptabilities, so that the restart operation of the laser printer can be controlled quickly and highly accurately from the beginning. [0158]

(4) Modifications (a) As a modification of the third embodiment, instead of the above-mentioned standard operation quantity set value, there can be used an average value of operation quantity set values in the past control case. This eliminates the need to previously determine the standard operation quantity by means of preliminary experiments or the like. Also, when the using environment of the laser printer by a user is not a standard environment common to an ordinary user but it is a special environment peculiar to the user, the operation quantity can be determined with the user's specific using environment taken into account.

(b) As another modification of the third embodiment, instead of the average value of the previous operation quantity set value and the standard operation quantity, there can be used an average value of a value obtained by weighting the previous operation quantity set value and the standard operation quantity. In this case, the weighting is performed in accordance with the length of the stopping time of the system or the laser printer. That is, if the stopping time is short, then the weight is large. Conversely, if the stopping time is long, then the weight is small. As a result, when the stopping time is short and therefore it is probable that status variations during the stopping time are small, the average value becomes close to the set value in the previous control. On the other hand, when the stopping time is long and therefore status variations during the stopping time is unpredictable, the average value becomes close to the standard set value.

(c) Also, the above-mentioned embodiments and modifications are not limitative but other various conversion means can be employed, for example, the previous operation quantity set value may be multiplied by a given coefficient. What is important is that the previous operation quantity set value is not used as it is but some changing processing is performed on the previous operation quantity set value to thereby be able to reduce effects caused by the variations in the status of the system or the laser printer between before and after it is restarted.

(d) Further, in the present embodiment, description has been given of the restart operation of the system after the power switch is turned off. However, the invention is not limited to this but the invention can also be applied to any other kinds of restart operations of the system, provided that it can be assumed that the status of the system vary greatly.

(e) Still further, in the present embodiment, although description has been given of the control of the operation of the laser printer, this is not limitative but the invention can also be applied to the control of the operation of other systems.

As described heretofore, according to the invention, due to the fact that the transition of the status is judged and, if the status transition is found, then a new control rule is formed from new control cases, there is eliminated the need to build a complicated control system previously on the assumption of various environmental conditions. Also, since the transition of the status and the formation of the control rule are carried out in an ex post facto manner, when image forming apparatuses are different from one another in performance and history, such differences can be adapted. The present invention is able to cope automatically with a change in the performance of an image forming apparatus caused by parts replacement or by aging. Further, according to the invention, there are used a plurality of control rules, the control rules are combined together with a weight corresponding to the adaptability to thereby form an application control rule, and a control processing is carried out according to the application control rule, so that, even if each of the control rules is only able to perform a rough control processing, a fine control processing can be achieved finally.

In addition, according to the invention when a system is restarted, effects caused by variations in the status of the system between before and after the restart operation thereof can be reduced and thus the restart operation of the system can be controlled quickly and highly accurately from the beginning thereof.

What is claimed is:

1. A control apparatus for use with a system having a status and outputting a control quantity, comprising:

operation quantity output means for applying an operation quantity to the system being controlled;

control quantity measuring means for measuring the control quantity output by the system in response to the operation quantity;

control case memory means for storing control cases, each control case including an operation quantity, a corresponding control quantity being output by the system in response to the operation quantity, and a corresponding system status;

system status quantity measurement means for measuring the system status;

cluster formation means for forming clusters of control cases having similar system status quantities;

control rule extracting means for forming a control rule for each said cluster of control cases to produce a plurality of control rules; and operation quantity calculating means for comparing each of said control rules formed by the control rule extracting means with an immediately preceding control result, weighting each of said control rules in accordance with the comparison result and averaging a sum of said weighted control rules to thereby synthesize a new control rule, determining, by using the synthesized new control rule, a new operation quantity, which when applied by the operation quantity output means will cause a new control quantity to equal a predetermined target value, and supplying the new operation quantity to the operation quantity output means, wherein when the system or a control operation thereon is restarted after a stop thereof, the operation quantity calculating means performs a given conversion on an operation quantity of said control case immediately before the stop, which causes the operation quantity output means to output the converted operation quantity, and compares each of said control rules with a control result obtained in response to the converted operation quantity.

2. An image forming apparatus for controlling an operation quantity so that a control quantity relating to image quality becomes a target value, said image forming apparatus comprising:

means for setting the target value;

means for measuring the control quantity;

means for detecting a restart of the image forming apparatus;

memory means for storing, as control rules, a plurality of functions defining a relationship between the operation quantity and the control quantity, each control rule being determined based on a given number of cases each including a particular operation quantity actually applied in the image forming apparatus and a corresponding control quantity actually measured;

application control rule generating means for generating an application control rule being used to calculate the operation quantity based on the measured control quantity by combining at least part of the plurality of functions;

standard operation quantity storing means for storing a standard operation quantity in a standard status of the image forming apparatus;

means for calculating, in response to detection of the restart of the image forming apparatus by the restart detecting means, a new operation quantity based on the standard operation quantity and an operation quantity that is determined based on the application control rule and a difference of the measured control quantity from the target value; and means for changing the operation quantity based on the calculated new operation quantity.

3. The image forming apparatus according to claim 2, wherein the calculating means calculates an average of the standard operation quantity and the operation quantity that is determined based on the application control rule and the difference of the measured control quantity from the target value.

4. The image forming apparatus according to claim 2, wherein the standard status of the image forming apparatus is a status that a temperature and a humidity are both predetermined values.

* * * * *